US007516366B2

(12) United States Patent
Lev et al.

(10) Patent No.: US 7,516,366 B2
(45) Date of Patent: Apr. 7, 2009

(54) SYSTEM AND METHOD FOR EXECUTING NESTED ATOMIC BLOCKS USING SPLIT HARDWARE TRANSACTIONS

(75) Inventors: Yosef Lev, Cambridge, MA (US); Jan-Willem Maessen, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 60 days.

(21) Appl. No.: 11/840,439

(22) Filed: Aug. 17, 2007

(65) Prior Publication Data

US 2009/0031310 A1    Jan. 29, 2009

Related U.S. Application Data

(60) Provisional application No. 60/952,430, filed on Jul. 27, 2007.

(51) Int. Cl.
*G06F 11/00* (2006.01)
(52) U.S. Cl. .............................. 714/38; 714/5; 711/153
(58) Field of Classification Search .................. 714/38, 714/37, 5, 7, 42, 54; 711/147, 148, 153; 717/124, 126, 140; 719/325
See application file for complete search history.

(56) References Cited

U.S. PATENT DOCUMENTS

| 2007/0136365 | A1* | 6/2007 | Tarditi et al. ............ 707/103 R |
| 2007/0198519 | A1* | 8/2007 | Dice et al. ..................... 707/8 |
| 2007/0198979 | A1* | 8/2007 | Dice et al. ................... 718/100 |
| 2007/0239942 | A1* | 10/2007 | Rajwar et al. ............... 711/147 |
| 2007/0300238 | A1* | 12/2007 | Kontothanassis et al. .... 719/320 |
| 2008/0127150 | A1* | 5/2008 | Duffy et al. ................. 717/159 |

OTHER PUBLICATIONS

U.S. Appl. No. 11/831,636, filed Jul. 31, 2007.
JaeWoong Chung, Chi Cao Minh, Brian D. Carlstrom and Christos Kozyrakis, "Parallelizing SPECjbb2000 with Transactional Memory," Computer Systems Laboratory, Stanford University, http://tcc.stanford.edu/publications/tcc_wtw2006_specjbb.pdf.
Austen McDonald, JaeWoong Chung, Brian D. Carlstrom, Chi Cao Minh, Hassan Chafi, Christos Kozyrakis and Kunle Olukotun, "Architectural Semantics for Practical Transactional Memory," Computer Systems Laboratory, Stanford University, Proceedings of the 33rd International Symposium on Computer Architecture, 2006.

* cited by examiner

*Primary Examiner*—Dieu-Minh Le
(74) *Attorney, Agent, or Firm*—Robert C. Kowert; Meyertons, Hood, Kivlin, Kowert & Goetzel, P.C.

(57) ABSTRACT

Split hardware transaction techniques may support execution of serial and parallel nesting of code within an atomic block to an arbitrary nesting depth. An atomic block including child code sequences nested within a parent code sequence may be executed using separate hardware transactions for each child, but the execution of the parent code sequence, the child code sequences, and other code within the atomic block may appear to have been executed as a single transaction. If a child transaction fails, it may be retried without retrying the parent code sequence or other child code sequences. Before a child transaction is executed, a determination of memory consistency may be made. If a memory inconsistency is detected, the child transaction may be retried or control may be returned to its parent. Memory inconsistencies between parallel child transactions may be resolved by serializing their execution before retrying at least one of them.

20 Claims, 11 Drawing Sheets

SYSTEM AND METHOD FOR EXECUTING NESTED ATOMIC BLOCKS USING SPLIT HARDWARE TRANSACTIONS

PRIORITY CLAIM

This application claims benefit of priority of U.S. Provisional Patent Application No. 60/952,430, entitled "System and Method for Executing Atomic Blocks Using Split Hardware Transactions" and filed on Jul. 27, 2007.

BACKGROUND OF THE INVENTION

1. Field of the Invention

This invention relates generally concurrent access to shared objects, and more particularly, to a system and method for executing nested atomic blocks of code using split hardware transactions.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks may give rise to a number of problems, both in terms of software engineering and in terms of performance. First, the right "balance" of locking must be achieved, so that correctness can be maintained, without preventing access to an unnecessary amount of unrelated data (thereby possibly causing other threads to wait when they do not have to). Furthermore, if not used carefully, locks can result in deadlock, causing software to freeze up. Moreover, it is frequently the case that whenever a thread is delayed (e.g. preempted) while holding a lock, other threads must wait before being able to acquire that lock.

Transactional memory is a paradigm that allows the programmer to design code as if multiple locations can be accessed and/or modified in a single atomic step. As typically defined, a transactional memory interface allows a programmer to designate certain sequences of operations as "atomic blocks", which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then may try to commit the transaction. If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware, with the hardware directly ensuring that a transaction is atomic, or in software that provides the "illusion" that the transaction is atomic, even though in fact it is executed in smaller atomic steps by the underlying hardware.

TM can be implemented in hardware (HTM) or in software (STM). While HTM solutions are generally faster than STM ones, many of the traditional HTM implementations do not support certain operations or events (like context switches, interrupts, or even the entry code of a function) while executing a transaction. Generally, if any of these events happens while executing a hardware transaction, the transaction is aborted. Operations that cause hardware transactions to fail or abort may be referred to as Non-Hardware-Transactionable (NHT) operations.

Traditionally, systems implement or support only a single type of transactional memory implementation. Moreover, a programmer generally must know about, and write code to support, the particular interfaces for implementing transactional memory. Furthermore, even if a system supports a particular transactional memory implementation, that implementation may not guarantee to support all transactions. For example, a system may support a "best-effort" hardware transactional memory (HTM) implementation, but since the implementation is "best-effort" not all transactions may be guaranteed to be supported. Thus, a programmer may wish to include functionality to fall back to a more flexible, if slower, transactional memory implementation that may guarantee support for all transactions. In order to do so, the programmer may have to specifically write code to support both the faster "best-effort" implementation and the slower fallback implementation at every location in the application for which the programmer wishes to execute instructions atomically.

Additional complications may be introduced when blocks of code are nested sequentially or in parallel. Traditionally, systems that support transactional memory implementations are not configured to efficiently support atomic execution of such nested blocks. For example, in typical systems supporting transactional memory operations, if a nested child transaction fails, its parent transaction must also fail.

SUMMARY

Transactional memory (TM) may support code sections that are to be executed atomically, i.e., so that they appear to be executed one at a time, with no interleaving between the steps of one transaction and another. This may allow programmers to write code that accesses and/or modifies multiple memory locations in a single atomic step, significantly reducing the difficulty of writing correct concurrent programs.

A split hardware transaction (SpHT) may split an atomic block of code into multiple segments, so that each segment may be executed using its own hardware transaction, such that all of the segments logically take effect atomically as a single atomic transaction. Although a split hardware transaction may use some software support to combine the different hardware transactions into one logically atomic operation, it may execute much faster than a corresponding software transaction executing the same atomic block.

In some embodiments, a split hardware transaction (SpHT) may allow execution of atomic blocks including non-hardware transactionable (NHT) operations without resulting to exclusively software transactions. For instance, a split hardware transaction may use a collection of hardware transactions that allows an atomic block to be split so the NHT operations may be performed between these hardware transactions. In other words, a split hardware transaction may pause by committing an active hardware transaction, perform one or more NHT operations and then resume, initiating another hardware transaction to continue executing the split hardware transaction.

Additionally, a split hardware transaction may utilize a thread-local buffer to log and/or maintain all memory accesses performed by the split hardware transaction. A split hardware transaction may begin by initiating a hardware transaction and using it to execute the atomic block's memory accesses. For example, the split hardware transaction may use the active hardware transaction to access various locations in shared memory, to copy values read from those locations into a local memory buffer, and to temporarily buffer shared-memory write operations of the atomic block in the same or a different local memory buffer. Additionally, to commit the split hardware transaction, the active hardware transaction may copy some values from the thread-local buffer to their appropriate locations in shared memory, and by that making the atomic block's effect visible to all other threads.

The use of split hardware transaction techniques may in some embodiments facilitate the execution of nested code within an atomic block. For example, if an atomic block includes one or more child code sequences nested within a parent code sequence, each of the child code sequences may be executed as one or more segments of the atomic block using a separate hardware transaction, but the execution of the parent code sequence, the child code sequences, and any other code within the atomic block may appear to have been executed as a single transaction. If one or more of the child code transactions fails, it may in some embodiments be possible to retry the failed child transaction without having to retry any previously-executed code from the parent code sequence or any other child code sequences that executed successfully.

Split hardware transaction techniques may in various embodiments support both serial and parallel nesting of code within an atomic block to an arbitrary nesting depth. For example, in one embodiment, a parent code sequence may be paused by committing an active hardware transaction (e.g., one that has completed execution of a segment of the parent code sequence), one or more NHT operations may be performed (e.g., saving and/or restoring a checkpoint of the read and/or write sets of the atomic block), one or more child transactions may be executed, and then execution of the parent code sequence may resume by initiating another hardware transaction to execute another segment of the parent code sequence.

In some embodiments, before a child code sequence is executed using a separate transaction, a determination may be made as to whether or not any locations in shared memory have been modified by code outside the atomic block during execution of the atomic block. In various embodiments, if a memory inconsistency is detected, the child transaction may be retried or control may be returned to the parent block, which may itself be aborted or retried. If the child transaction is retried, before it is retried, a checkpoint of the read and/or write sets of the atomic block may be restored to a state corresponding to the state prior to the failed execution of the child transaction. In embodiments supporting multiple levels of nesting, upon a failure of a child transaction, control may be returned to a parent block, and then to its successive ancestor block(s) until a valid checkpoint may be restored. In embodiments supporting parallel nesting, memory consistency between child transactions may also be validated, and any inconsistencies may be resolved by serializing the execution of the child transactions before retrying at least one of them.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A split hardware transaction (SpHT) involves splitting an atomic block of code so that it will be executed using multiple hardware transactions, while logically seeming to take effect as a single atomic transaction. In some embodiments, a split hardware transaction (SpHT) may allow execution of atomic blocks including NHT operations without relying on exclusively software transactions. For instance, a split hardware transaction may use a collection of hardware transactions that are combined together (using some software support) so that they logically seem to take effect atomically. This allows an atomic block to be split so that it will be executed using multiple hardware transactions, while executing the NHT operations in between the hardware transactions. Although a split hardware transaction may use some software support to combine the different hardware transactions into one logically atomic operation, it may execute much faster than a corresponding software transaction executing the same atomic block.

Figure 1:
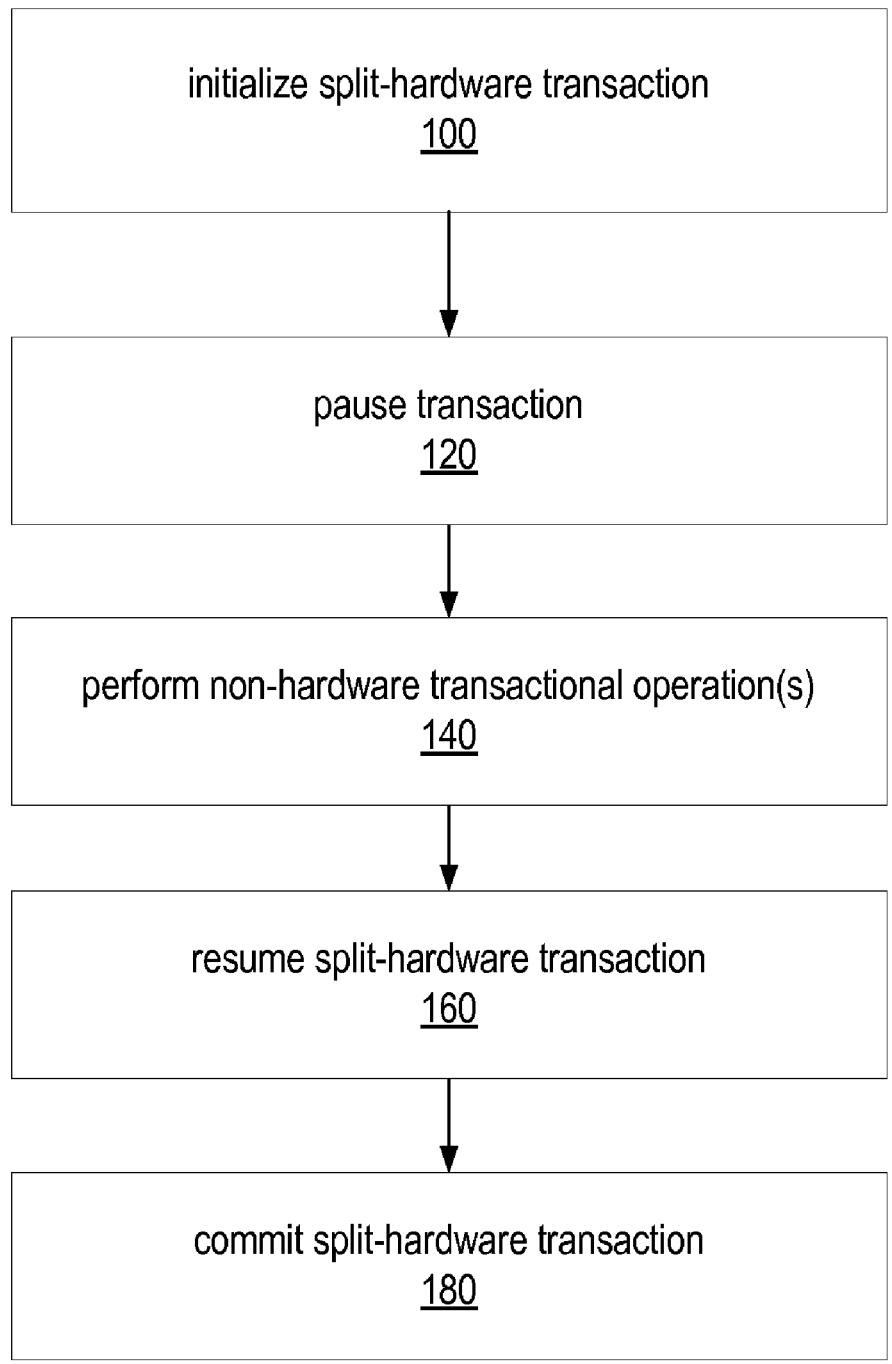
FIG. 1 is a flowchart illustrating one embodiment of a method for using a split hardware transaction, as described herein.

FIG. 1 is a flowchart illustrating one embodiment of a method for using split hardware transactions, as described herein. First of all, the split hardware transaction may be started or initialized, as illustrated by block 100. In some embodiments, the split hardware transaction may then initialize a hardware transaction.

To execute a NHT operation, the split hardware transaction may pause, as indicated by block 120, and commit the active hardware transaction. After performing or executing the NHT operation(s) as illustrated by block 140, the split hardware transaction may resume, as indicated by block 160. According to some embodiments, as part of resuming, the split hardware transaction may initiate a new hardware transaction to execute the rest of the atomic block. Additionally, the split hardware transaction may ultimately try committing to shared memory, as indicated by block 180. In some embodiments, the active hardware transaction initiated as part of resuming the split hardware transaction may also be used to commit the overall split hardware transaction. In some embodiments, a split hardware transaction that fails to commit may be retried one or more times.

A split hardware transaction may utilize a thread-local buffer that maintains and/or logs all memory accesses it executes. A split hardware transaction may begin by initiating a hardware transaction and using it to execute the atomic block's memory accesses. For example, the split hardware transaction may use the active hardware transaction to access various locations in shared memory and to copy some values read from those locations into a read-set maintained in the thread-local buffer. For example, in some embodiments, some writes executed by the atomic block may be logged in a write-set maintained in the thread-local buffer and not written in the shared memory until the SpHT commits.

The information stored in the local buffer by the first hardware transaction (i.e., the current read and write sets associated with the split transaction) may be used as a checkpoint of the split transaction for a second hardware transaction, so that it can restore the state of the first hardware transaction and verify that this state is consistent with the current state of the memory. In other words, a second hardware transaction initiated by the SpHT can use the information stored by the first transaction in the thread-local buffer, to verify that no other process or thread modified any of the shared memory locations accessed by the first hardware transaction after the first hardware transaction has committed and prior to beginning the second hardware transaction.

Because a split hardware transaction's buffer may be local to the thread executing the split hardware transaction, in some embodiments, it is guaranteed that no other thread sees the effect of committing the first hardware transaction of a split hardware transaction. Finally, to commit the split hardware transaction, the active hardware transaction may copy the values from the thread-local buffer to their appropriate locations in shared memory, thereby making the atomic block's effect visible to all other threads upon successful completion of that hardware transaction.

Note that although the operations executed while the split hardware transaction is paused may not be part of its atomic operation, such operations may take advantage of the fact that all read and write operations performed by the split hardware transaction prior to being paused may be logged in the local buffer. In one embodiment, a debugger may be able to implement a breakpoint in an atomic block, which might normally cause a hardware transaction to abort. For example, a debugger may pause a split hardware transaction and examine the transaction's local buffer to discover what values were read and written by the atomic block's execution up to the breakpoint.

In some embodiments, a split hardware transaction may not require any additional hardware support other than a basic hardware transactional memory solution. Thus, split hardware transactions may be implemented utilizing the most basic best-effort hardware transactional memory solution. Therefore, a split hardware transaction mechanism may allow a wider variety of atomic blocks, such as those including NHT operations, to be executing using, with some software support, any of various hardware transactional memory implementations. Although executing an atomic block with a SpHT uses some software support (e.g., to manage the thread-local memory buffers), it may be much faster than an execution using a purely software transaction due, at least in part, to the SpHT's use of multiple hardware transactions.

Note that since, in some embodiments, the SpHT algorithm relies on hardware transactions, a split hardware transaction may fail to execute some atomic blocks. For example, a split hardware transaction may fail to execute atomic blocks that access more memory locations than are supported by the underlying HTM implementation. However, the SpHT algorithm may, in some embodiments, be combined with other hardware and software transaction mechanisms in a hybrid approach, as will be discussed in more detail below, to achieve a robust and efficient TM solution.

Finally, as will be described in more detail below, a system and method for executing split hardware transactions may be exploited for use in execution of nested atomic blocks, using the pause/resume methods described herein. For example, at least two forms of transactional nesting may be supported using these methods: closed sequential nesting and closed parallel nesting. The application of split hardware transaction techniques to closed sequential nesting may permit a nested child transaction to re-run in case of conflict without abandoning execution of the parent transaction. The application of split hardware transactions to closed parallel nesting may permit two or more nested child transactions to execute independently in parallel such that when they successfully complete, execution of the parent transaction continues. In such embodiments, effects of child transactions may not be visible outside the parent transaction until the parent commits. Parallel nested transactions may be atomic with respect to one another, although it will appear to the programmer as if they executed sequentially in some order. This apparent ordering may vary, according to different embodiments.

As described above, a programmer may write code specifying that certain operations, functions, etc., should be executed atomically. In some embodiments, the operations may not actually be executed atomically, but may appear to be executed atomically to other processes or threads also executing in the same system. When generating a compiled version of an application including the source code, a compiler, such as compiler 220 (illustrated in FIG. 2, discussed below) may analyze the programmer's source code and rather than directly compiling the atomic block specified by the programmer, may decide to generate code configured to execute the atomic block using the split hardware transaction mechanism.

Figure 2:
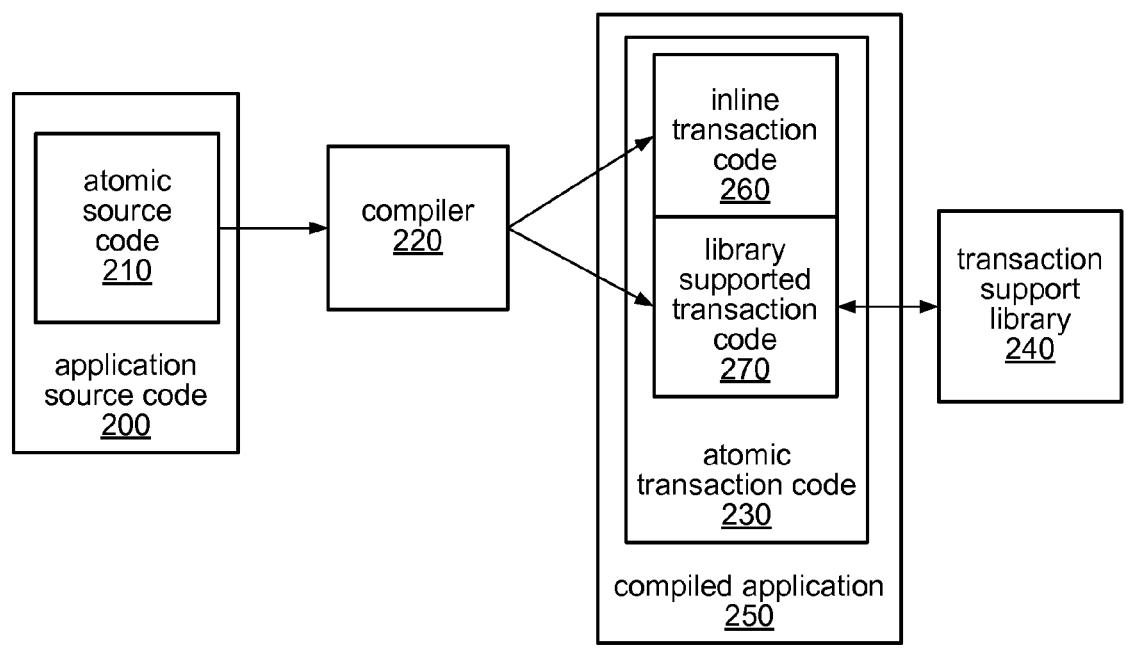
FIG. 2 is a block diagram illustrating a compiler generating split hardware transaction code, as described herein.

FIG. 2 is a block diagram illustrating a compiler 220 configured to analyze application source code 200, identify one or more sets of atomic source code 210 and then generate atomic transaction code 230 as part of a compiled application 250. A compiler, such as compiler 220 may be configured to replace programmer written code that is to be executed atomically, such as in atomic source code 210, with code for implementing a split hardware transaction, such as atomic transaction code 230. For example, a programmer may write the source code for an application, such as application source code 200, using atomic blocks to specify sets of instructions that should be executed atomically and/or as a transaction. For example, the program may include sets of instructions to be executed atomically together within a set of curly brackets (e.g., "{ }") preceded by the term "atomic", thus indicating that the instructions within the brackets should be executed atomically.

Compiler 220 may, such as during the compilation of application source code 200, identify one or more sets of instructions to be executed atomically, such as by recognizing the atomic keyword, in one embodiment. In other embodiments, a programmer may use other or additional manners to indicate sets of instructions to be executed atomically. For instance, in one embodiment, a programmer may designate that certain methods and/or functions should be executed atomically, such as by using the atomic keyword (or some other language construct) in the method or function definition. In other embodiments operations to be executed atomically may be designated using pairs of keywords, such as "transactional_memory_section_begin" and "transactional_memory_section_end", to specify the beginning and end, respectively, of a group of operations. Thus, compiler 220 may be configured to identify sets of instructions or other fragments or portions of an application (e.g., functions, objects, methods, classes, etc) by recognizing any of various language constructs that may be used to designate those instructions, fragments or portions to be executed atomically.

A programmer may also use a particular language construct, such as an atomic keyword, to designate specific data structures, classes and/or objects that should be accessed using transactions. Thus, in some embodiments, compiler 220 may be configured to recognize such atomic structures, classes and/or objects and to generate code to ensure that they are accessed using transactions.

Additionally, compiler 220 may, in some embodiments, be configured to generate code configured to determine at runtime whether or not an atomic block includes any non-hardware-transactionable (NHT) operations. In some embodiments, compiler 220 may be configured to generate split hardware transaction source code to pause the split hardware transaction prior to executing the NHT operations and to resume the split hardware transaction after completion of the NHT operations. As noted above, when a split hardware transaction is paused, any active hardware transaction of the split hardware transaction may be committed and when the split hardware transaction is resumed, a new hardware transaction may be initiated. Thus, compiler 120 may, in some embodiments, be configured to generate code for committing active hardware transactions when pausing a split hardware transaction prior to performing NHT operations and to generate code for initializing new hardware transactions when resuming a paused split hardware transaction.

As described previously, programmers may write transaction code once using familiar coding styles, but the transaction may be effected according to one of a number of compatible alternative implementation techniques. Programmers may not need to write multiple versions of their code in order to exploit alternative implementation approaches, or even be specifically aware of the particular transaction implementations. Instead, the transaction code written by the programmer may be translated, replaced or transformed into code that is configured to implement transactions according to any of various techniques, including SpHT. In some embodiments, the particular technique implemented for each transaction may not be decided until runtime. The compiler may enable the implementation of multiple, alternative transactional memory schemes. At runtime, any of the various implemented techniques may be used to effect the transaction and if a first technique fails or is inappropriate for a particular transaction, one or more other techniques may be attempted.

In yet other embodiments, compiler 220 may be configured to generate both inline transaction code 260 and library supported transaction code 270 in atomic translation code 230, as illustrated by FIG. 2. For example, inline transaction code 260 may be configured to implement certain transaction techniques, such as a default transaction technique, while library supported transaction code 270 may be configured to implement other transaction techniques. Additionally, when atomic transaction code 230 includes both inline transaction code 260 and library supported transaction code 270, different parts of transaction techniques may be performed by inline transaction code 260 or by library supported transaction code 270, according to various embodiments.

For example, in some embodiments, library supported transaction code 260 may be configured to call functions provided by transaction support library 240 to determine which transaction technique to use for a particular transaction, but inline transaction code 260 may include the functionality for implementing that transaction technique as one of the multiple code paths generated by compiler 220. For instance the following pseudo-code represents one possible embodiment of functionality included in atomic transaction code 230:

```
do
    // ask support library which code path to use
    i = whichCodePath(...);
    ...
        attempt to execute transaction using codepath i
    ...
until attempt succeeds
```

While described herein mainly in terms of a compiler, compiler 220 may also represent other entities configured to generate atomic transaction code 230, according to different embodiments. For instance, in one embodiment, compiler 220 may represent a code optimizer rather than a compiler. In another embodiment, compiler 220 may represent a just-in-time (JIT) compiler rather than a more standard compiler. In some embodiments, compiler 220 may represent an assembler rather than a compiler. In general, compiler 220 may represent any entity capable of and configured to generate atomic transaction code for implementing multiple, alternative transaction methods, as described herein. While described herein as various software entities, compiler 220 may, in some embodiments, represent a hardware-based entity configured to generate atomic transaction code for implementing multiple, alternative transaction methods.

Atomic source code 210 may represent code instructions in any of various languages, according to various embodiments. For example, in some embodiments, atomic source code 210 may represent code written in a high level programming language, such as C, C++, or Java™. In other embodiments, atomic source code 210 may represent binary instructions or assembly language instructions. In yet other embodiments, atomic source code 210 may also represent compiler-intermediate instructions, or virtual machine byte code instructions, such as Java™ byte code instructions.

In some embodiments, atomic transaction code 230 may be configured to include all the various code paths for implementing split hardware transactions inline, such as in inline transaction code 260. In other embodiments, however, atomic transaction code 230 may be configured to utilize and/or include a library of transaction enabling code, such as transaction support library 240. Atomic transaction code 230 may be configured to call various functions provided by transaction support library 240. Transaction support library 240 may include the actual functionality to execute split hardware transactions in some embodiments. Thus, in some embodiments, compiler 220 may be configured to generate atomic transaction code 230 to include library supported transaction code 270 configured to call functions provided by transaction support library 240 to implement split hardware transactions.

Atomic transaction code 230 may include inline transaction code 260, library supported transaction code 270 or both, according to various embodiments. Thus, functionality described herein as being performed by atomic transaction code 260 may be performed by inline transaction code 260 in some embodiments and by library supported transaction code 270 in other embodiments. For example, in some embodiments, inline transaction code 260 may include the functionality to implement split hardware transactions. In other embodiments, however, library supported transaction code 270 may be configured to call one or more functions of transaction support library 240 to implement split hardware transactions.

The SpHT Algorithm

In some embodiments, a split hardware transaction may be implemented in transaction support library 240. For example, in one embodiment, transaction support library 240 may be configured to expose an API of functions for implementing split hardware transactions. For instance, in one embodiment, transaction support library 240 may be configured to expose an API including, but not limited to, the following functions or operations: SpHT_begin, SpHT_read, SpHT_write, SpHT_pause, SpHT_resume and SpHT_commit. Thus, SpHT_ begin may be called to initiate a split hardware transaction, SpHT_read and SpHT_write may be used for all read and write operations during the transaction and SpHT_commit may be used to try committing the split hardware transaction. SpHT_pause may be used to temporarily stop the split hardware transaction, such as to execute a NHT operation, while SpHT_resume may be called to continue a paused split hardware transaction. In some embodiments, SpHT_pause may commit any active hardware transaction of the SpHT and SpHT_resume may initiate a new hardware transaction.

A SpHT may maintain thread-local memory buffers or sets. For example, in one embodiment, a SpHT may maintain two thread-local sets: a read set and a write set. The read set includes the values for each location read by the SpHT. This value may be referred to as the pre-transactional value of the location. The write set may include the latest value for each location written by the SpHT. Remember that the SpHT may maintain all values to be written to the shared memory locally until the SpHT is committed (using a hardware transaction). The SpHT may begin with empty read and write sets in the local buffer. To read location l, the SpHT_read operation may first check whether the write set contains an entry for l. If it does, SpHT_read may simply return the value stored in that entry. Otherwise it may read the value from location l (from shared memory) and add to the read set an entry for l, if such does not already exist. A SpHT_write operation may add an entry to the write set (or update an existing one) for the written location with the written value. In other words, a split hardware transaction may only modify values in the local write set until the entire atomic block (executed by the split hardware transaction) is committed.

Figure 3:
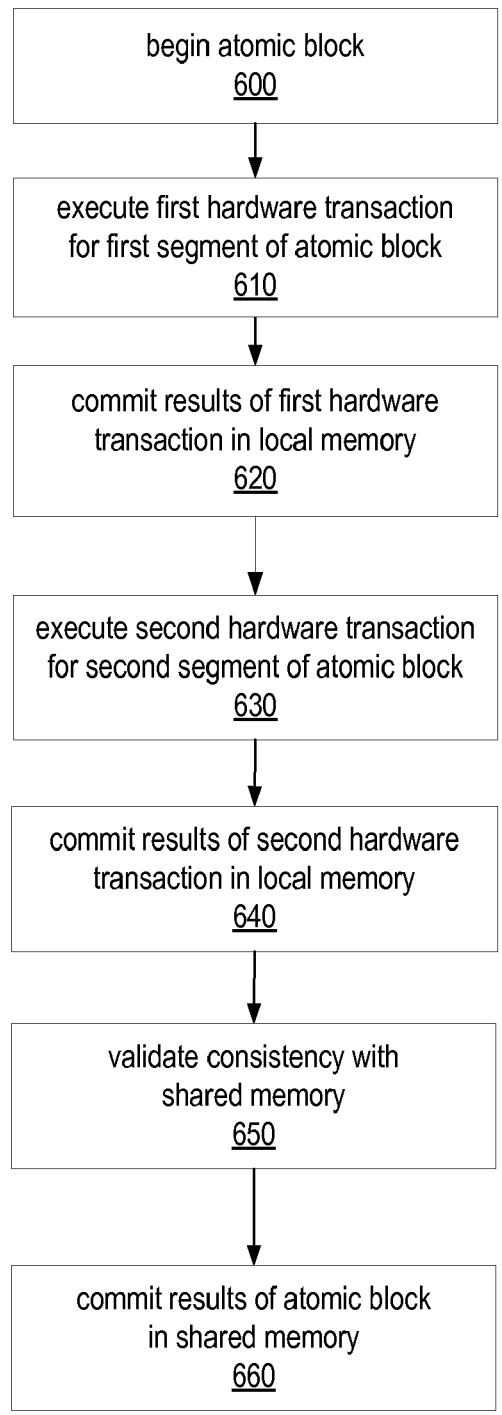
FIG. 3 is a flowchart illustrating one embodiment of a method for executing a split hardware transaction, as described herein.

FIG. 3 illustrates one embodiment of a method for executing split hardware transactions, as described herein. In this example, an atomic block of code that performs read and write operations to and from a shared memory is begun, as illustrated by block 600. As noted above, a programmer may designate a block of code for atomic execution by marking source code with particular keywords, by calling particular functions from a transaction support library, or by other means. In this example, the atomic block may be split into two segments and atomicity may be guaranteed across the two segments through the use of supporting software instructions and data structures (e.g., thread-local buffers), as described herein.

Execution of the first segment of the atomic block may be executed as a first hardware transaction, as described above. This is illustrated by block 610. Execution of the first segment may include executing read operations by reading from a shared memory into a local memory to log read accesses, in some embodiments. Execution of the first segment may also include executing write operations by writing values to the local memory, rather than to the shared memory. Because the first segment is executed as a first hardware transaction, reads and writes within the segment are guaranteed to be executed atomically. Once complete, the results of the first segment are committed to the local memory, as shown in block 620.

In the example illustrated in FIG. 3, the method may include executing the second segment of the atomic block as a second hardware transaction, as in block 630. In some embodiments, before execution of the second hardware transaction begins, a determination may be made as to whether any locations in the shared memory accessed by a read operation in the first transaction were changed since the time the first transaction was committed (not shown). If so, the entire atomic block may be aborted or it may be retried, in different embodiments, as discussed herein.

As was the case with the first segment, execution of the second segment may include executing read operations by reading from a shared memory into a local memory to log read accesses, in some embodiments and executing write operations by writing values to the local memory, rather than to the shared memory. Because the second segment is executed as a second hardware transaction, reads and writes within the segment are guaranteed to be executed atomically. Once complete, the results of the second segment are committed to the local memory, as shown in block 640.

As illustrated in FIG. 3, once both the first and second segments of the atomic block have successfully completed and committed their results in local memory, the method may include validating that the current contents of locations in the shared memory that were read by the atomic block are consistent with the values copied from the shared memory to the local memory. This is illustrated in block 650. If the values previously read are inconsistent with the current state of those shared memory locations, execution of the atomic block may be aborted or retried, in various embodiments.

If the values previously read by the atomic block and copied into the local memory are consistent with the current state of the shared memory, the results of the atomic block may be committed. This is illustrated in block 660. For example, in some embodiments, the results committed by the second transaction may be copied to the shared memory from the local memory in response to successfully committing the results of the second transaction and validating memory consistency. In some embodiments, this copying operation may be performed as part of the second transaction itself (i.e., as part of the same transaction as the validation operation), ensuring atomicity across the validation and commitment operations. In this example, although the atomic block was executed using two separate hardware transactions, it may appear to the shared memory (and to other processes accessing the shared memory) that the first and second segments of the atomic block were executed by a single hardware transaction. In other words, in this example, all the reads and all the writes of the atomic block will take effect together, as if they were performed by a single atomic transaction.

Figure 4:
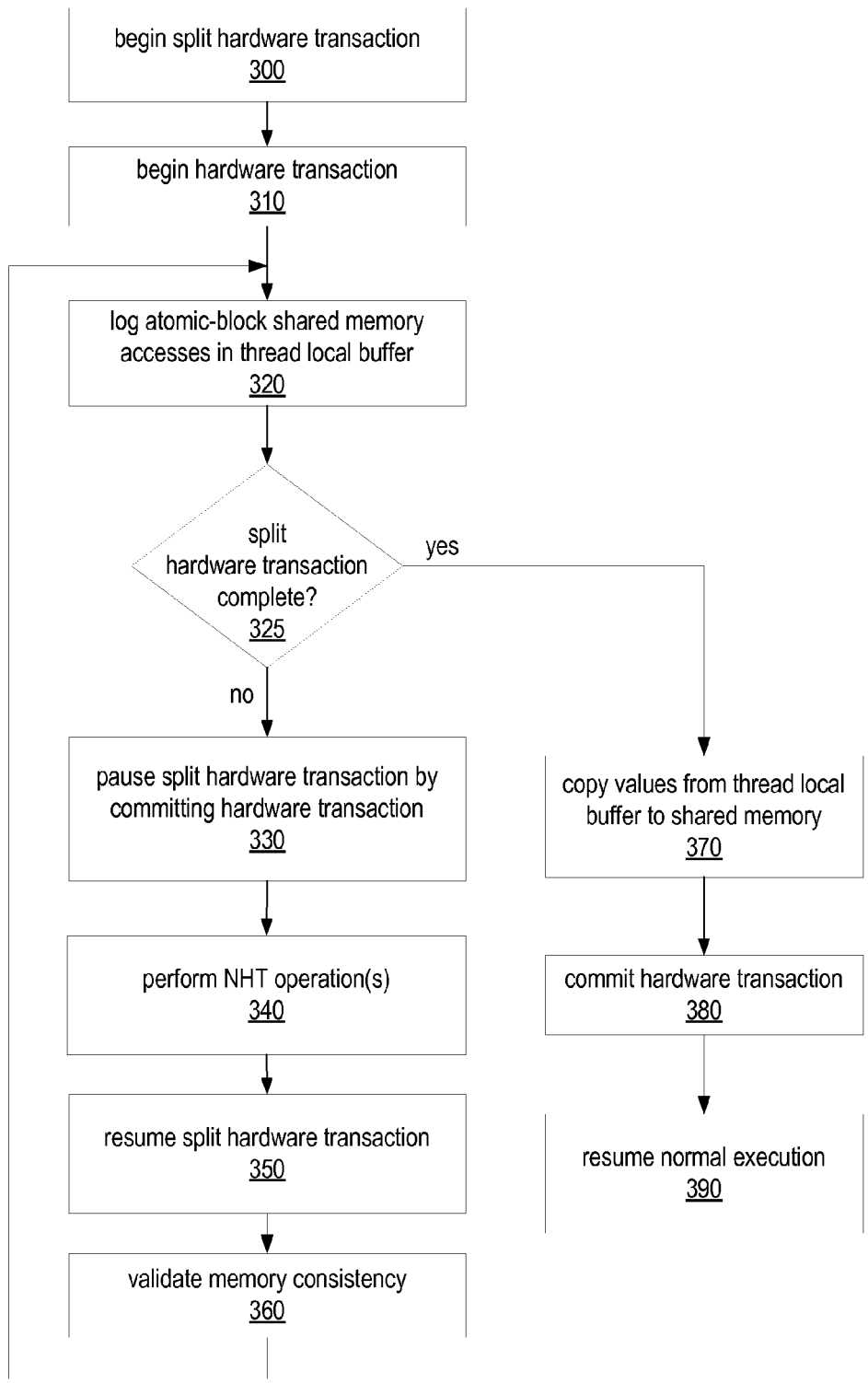
FIG. 4 illustrates one embodiment of a method for implementing a split hardware transaction, as described herein.

FIG. 4 illustrates another embodiment of a method for implementing a split hardware transaction, as described herein. A split hardware transaction is begun, as illustrated by block 300. As noted above, in some embodiments, a split hardware transaction may be started because a programmer specifically coded a split hardware transaction, such as by calling functions from transaction support library 240. In other embodiments, as will be described in more detail below, a compiler may have implemented a split hardware transaction in response to a programmer specifying a particular section of code as an atomic block, such as by using an atomic keyword. In yet other embodiments, a split hardware transaction may be started as part of a transaction solution that uses different transactional schemas. For instance, a compiler may implement transactional code that first attempts one transactional technique, such as a pure hardware transaction, and if that fails, then attempts a different transactional technique, such as a split hardware transaction.

When starting a split hardware transaction, the atomic source code may call a function, such as SpHT_begin. The SpHT_begin operation may initiate a new hardware transaction, as indicated by block 310. Since a single split hardware transaction may involve multiple hardware transactions, the most recent hardware transaction initiated by the split hardware transaction may be referred to as the active transaction. In general, all memory accesses within a split hardware transaction are done using the active hardware transaction. In addition, after beginning the hardware transaction, as illustrated by block 310, the split hardware transaction may log the accesses to shared memory performed by the atomic-block to a thread-local memory buffer, as indicated by block 320 and as described above regarding SpHT read and write operations. For instance, the split hardware transaction may copy values for all the locations in the shared memory that may be affected by, or that may affect, the split hardware transaction. Also, at any time during its execution (i.e., before the SpHT is complete, indicated by the negative exit from 325), the split hardware transaction may be paused by committing the active hardware transaction, as indicated by block 330.

In some embodiments, the split hardware transaction may commit the active hardware transaction as part of pausing the split hardware transaction. For example, a function to pause the split hardware transaction, such as SpHT_pause, may be configured to also commit the active hardware transaction. In one embodiment, a split hardware transaction may be coded to pause the transaction because of one or more non-hardware-transactionable (NHT) operations, or an NHT event, such as a system interrupt, a context switch, or other system event.

After pausing the split hardware transaction, as illustrated by block 330, one or more non-hardware-transactionable (NHT) operations may be performed, as indicated by block 340. As noted above, any of various types of functions, procedures, and/or other operations or events, such as context switches or system interrupts, may cause the active hardware transaction to fail. Thus, a split hardware transaction tries committing the active hardware transactions prior to executing any NHT operation or event.

After the NHT operation or event is executed, the split hardware transaction may be resumed, as indicated by block 350. In some embodiments, a split hardware transaction may be resumed by calling a function such as SpHT_resume. In some embodiments, when resuming, a split hardware transaction may begin a new hardware transaction, which may restore the state of the previous active transaction by reading all shared memory locations stored in the local read set and verifying that they still have their pre-transactional values, thus validating memory consistency as illustrated by block 360. In other words, a split hardware transaction may, upon resuming, verify that all the locations read by the split hardware transaction still have the same values as when they were previously read by the split hardware transaction. If another process or thread modified one or more of the values copied from the shared memory to the local memory buffer, the split hardware transaction may be retried, in part or in whole, or may return a failure. In some embodiments, the SpHT may resume, execute some additional read/write operations and the corresponding logging, as described above regarding block 320, for additional segments of the split hardware transaction, as indicated by the feedback loop from block 360 to block 320. In some embodiments, following execution of the final hardware transaction (i.e., when the SpHT operations are complete, indicated by the positive exit from 325), the SpHT may attempt to commit, as indicated by the arrow from the output of block 325 to block 370.

Additionally, the split hardware transaction may be completed by using the active hardware transaction (block 370) to copy the values from the write set to the appropriate locations in shared memory and committing the active hardware transaction, as indicated by block 380. In other words, since the active hardware transaction may include the last hardware transaction of the SpHT, committing it may commit the split hardware transaction. A split hardware transaction commits successfully if and only if all hardware transactions it initiated were either retried or committed successfully, according to some embodiments. After committing the final hardware transaction, as illustrated by block 380, normal execution may be resumed, as indicated by block 390.

The example embodiment discussed above regarding FIG. 4 may have involved a split hardware transaction that uses two hardware transactions—one to initially read values from shared memory into the local buffer prior to performing an NHT operation and another to finish and commit the split hardware transaction after performing the NHT operation(s). In other embodiments, however, a split hardware transaction may utilize more than two hardware transactions. In general, a split hardware transaction may be implemented using virtually any number of hardware transactions.

One reason the SpHT may be considered to be logically atomic is that each hardware transaction initiated by the SpHT may verify that all locations read by the SpHT so far have their pre-transactional values, as indicated by the read-set maintained in the thread-local buffer. An active hardware transaction of a split hardware transaction aborts if any relevant location has changed during execution of the split hardware transaction. This guarantees that as long as no active transaction is aborted, all values read by the SpHT represent a consistent view of memory. In particular, when the last hardware transaction, that copies the values from the thread-local write-set to shared memory, commits, all locations read by the SpHT are guaranteed to contain their pre-transactional values. Therefore the SpHT may seem to take effect atomically at this point, in which all values written by the SpHT become visible to all other threads, and all locations read by the SpHT are guaranteed to have their pre-transactional values.

Finally, note that operations executed between SpHT_pause and SpHT_resume may require some care. These operations may be executed non-transactionally, and therefore may take effect immediately and not when the SpHT takes effect (e.g., is committed). In particular, these operations may not be undone or rolled-back if the split hardware transaction aborts.

In some embodiments, a split hardware transaction may be configured to execute atomic blocks that include function calls even when the underlying hardware transactional memory implementation does not support function calls, such as because the function entry and exit code contain NHT instructions. Thus, while a hardware transaction may be aborted by the function's entry and/or exit code, a SpHT can be paused before and resumed after these code segments are executed, allowing atomic blocks that include function calls to be executed atomically while still benefiting best effort hardware transactional memory (HTM).

Figure 5:
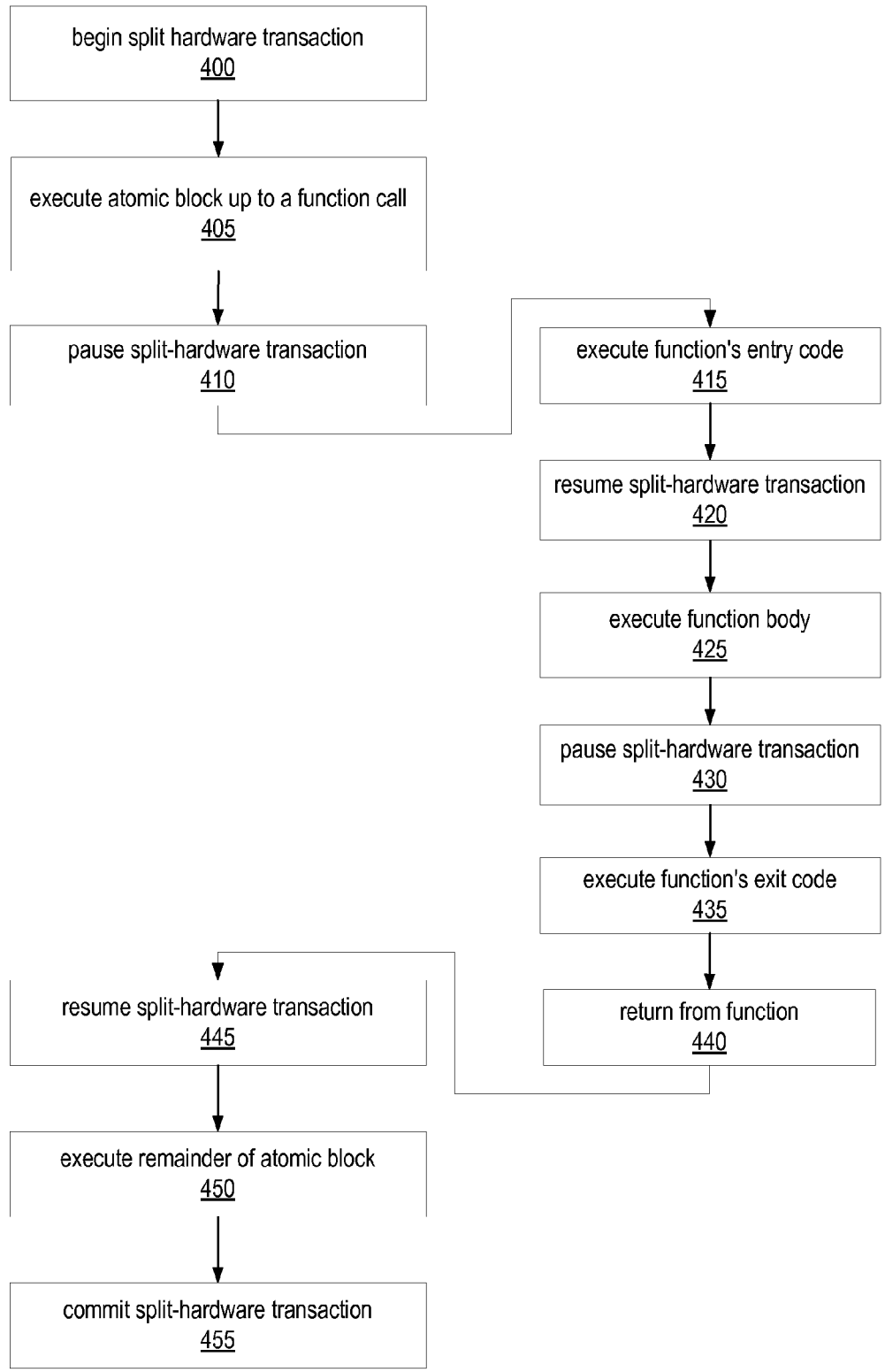
FIG. 5 illustrates one embodiment of a method for executing a function call within a split hardware transaction.

FIG. 5 illustrates one embodiment of a method for executing an atomic block that contains a function call using a split hardware transaction. For example, a split hardware transaction may begin, as illustrated by block 400 and may execute the atomic block up to a function call, as indicated by block 405. Since the called function's entry and/or exit code may perform a NHT operation, for example pushing or popping a stack frame, the split hardware transaction may be paused before executing the function's entry code, as indicated by block 410. The split hardware transaction may, in some embodiments, be paused by calling SpHT_pause or another function provided by transaction support library 240. The called function may then execute its entry code, as illustrated by block 415, and may also be configured to resume the split hardware transaction, as indicated by block 420. By pausing and resuming the split hardware transaction around a called function's entry and/or exit code, the body of the function call may executed as part of the split hardware transaction.

The function body may then be executed, as indicated by block 425. In some embodiments, the function body may read, write and operate on values from the shared memory or on those stored in the local buffer. As noted above, every code block executed by a SpHT while it is not paused may use split hardware transaction aware functions, such as SpHT_read and SpHT_write for all its shared memory read/write operations. Similarly, during the execution of the body of the called function, SpHT_read and SpHT_write may be used for memory accesses to the shared memory.

After the body of the called function is executed, the split hardware transaction may be paused again, as indicated by block 430. Since the called function's exit code may also cause an active hardware transaction to abort, the split hardware transaction may be paused prior to executing the called function's exit code, as indicated by block 435, and may subsequently return from the called function, as indicated by block 440. After the called function returns, the split hardware transaction may be resumed, as illustrated by block 445, and the remainder of the atomic block may be executed, as indicated by block 450. Finally, the split hardware transaction may be committed, as illustrated by block 455 and described above.

Additionally, if the hardware transaction active during the execution of the function body fails or aborts, the hardware transaction may be configured to branch to the function's exit code, which will return the control to the caller. If the active hardware transaction fails during the execution of the called function, the SpHT may not commit successfully.

Surviving Context Switches and Interrupts

In some embodiments, a split hardware transaction may be completed even if it is interrupted by a context switch or an interrupt event. For instance, the split hardware transaction may be paused before the context switch or interrupt event and may be resumed afterwards. This can be done, for example, by providing the operating system with an event handler function to be executed prior to a context switch or other interrupt event. The event handler may then pause the split hardware transaction, such as by calling a SpHT_pause function or operation exposed by transaction support library 240.

Even if it is not guaranteed that an event handler function is always called before the event, the split hardware transaction may still function properly. That is, a split hardware transaction may be implemented so that even if an unexpected context switch (or other interrupt event) occurs, the split hardware transaction will abort or fail gracefully, and won't violate the atomicity of the atomic-block's execution. In some embodiments, if a split hardware transaction is not paused before such an event occurs, the active hardware transaction may abort and cause the split hardware transaction to fail. However, as discussed above, the split hardware transaction may be configured to retry a number of times before completely failing. Finally, even in the absence of any support for event handler functions, a split hardware transaction may be paused before executing instructions that are known, or suspected, to cause context switches or other interrupt events (e.g., various system calls).

Debugging Transactional Code—Breakpoints

When debugging transactional code, it might be desirable to place a breakpoint inside an atomic block. However, many HTM implementations may not support breaking the execution of a hardware transaction while keeping it viable. As described above, a breakpoint may cause hardware transactions to fail in some embodiments. With the SpHT algorithm, a breakpoint may be implemented by pausing a split hardware transaction prior to the breakpoint instruction. For example, in one embodiment, the debugger itself may be configured to pause an active split hardware transaction, such as by calling a SpHT_pause operation exposed or provided by transaction support library 240. In addition, a compiler may modify the code corresponding to an atomic block to use the SpHT mechanism when debugging is turned on, in order to allow the debugger to pause the atomic block execution. Debugging a split hardware transaction by pausing the transaction at breakpoints may, in some embodiments, be faster than always executing an atomic block using a purely software transactional mechanism when debugging. In addition, by allowing a debugger to access the split hardware transaction's local memory buffer, additional debugging features may be supported.

Omitting Some Hardware Transactions

While described above as involving multiple hardware transactions, in some embodiments, a split hardware transaction may only utilize a single, final hardware transaction. In some embodiments, only a single hardware transaction may be required to ensure that the split hardware transaction is either completed atomically or that it doesn't have any effect at all. For example, the last hardware transaction executed by the split hardware transaction may read all locations read during the split hardware transaction execution and copy all values from the write-set to their appropriate shared memory locations, so a successful commit of that transaction guarantees that the split hardware transaction takes effect atomically. Additionally, if the last hardware transaction fails or aborts, none of the locations of shared memory will be updated by the split hardware transaction and thus, the split hardware transaction may have no effect at all.

A split hardware transaction may, according to one embodiment, use more than one hardware transaction to guarantee memory consistency during its execution. In other words, multiple hardware transactions may be used to ensure that during the split hardware transaction execution all values it read correspond to a consistent state of the memory. However, in some embodiments, a split hardware transaction may not need to guarantee memory consistency during the entire execution of the transaction. In many cases, some of the code between resuming and subsequently pausing or committing a split hardware transaction may be executed without a guarantee of memory consistency. For example, if the code segment does not execute any shared memory reads, or if no calculation or decision it performs is based on a value it reads, it may, in some embodiments, be executed without a guarantee of memory consistency. Thus, in some embodiments, when compiler 220 generates code that executes an atomic block using SpHT, compiler 220 may decide that a specific segment between SpHT_begin/SpHT_resume and SpHT_pause/SpHT_commit can be executed without the memory consistency guarantee, and notify the SpHT mechanism, such as by passing a parameter to the SpHT_resume/SpHT_begin method. In this case, the split hardware transaction may execute that code without an active hardware transaction, such as by not resuming the split hardware transaction, and therefore without initialing a new hardware transaction. Detecting such code segments may be done, for example, by the programmer writing the atomic block, or by a compiler, such as compiler 220, used to translate programmer code to code interfacing the split hardware transaction mechanism, according to different embodiments. Detecting these code segments may, in some embodiments, significantly reduce the number of hardware transactions and restore-state operations executed by a split hardware transaction, and thereby potentially improve its performance.

Multiple Fail Addresses:

In some embodiments and depending on the particular HTM implementation, beginning a hardware transaction may require a provided "fail address" indicating the next instruction to be executed if the hardware transaction is aborted. With the SpHT algorithm, in some embodiments, different hardware transactions initiated by a split hardware transaction may need to have different fail addresses, such as because of the need to clean-up the effect of non-transactional operations that were already executed while the SpHT was paused. For just an example, the hardware transaction running the body of a function called from within a split hardware transaction may need to branch to the function's exit code if the hardware transaction is aborted, so it can undo operations done by the function's entry code (such as popping values from a stack that it pushed upon entry). In such a case, the SpHT mechanism may be notified that the hardware transaction has failed, such as to allow subsequent attempts to resume and/or commit the split hardware transaction to immediately fail (and/or branch to the next fail address if necessary).

In some embodiments, the SpHT interface may include an additional parameter to, for example, the SpHT_begin and SpHT_resume functions. The additional parameter may specify a fail address to be used for that part of the execution of the atomic block. In addition, the SpHT interface may include a specific function, such as a SpHT_failed operation, that may notify the SpHT mechanism regarding failure of particular hardware transactions.

The following pseudo-code illustrates one embodiment of an implementation of a split hardware transaction calling a function and specifying multiple fail addresses. This first section of pseudo-code may represent one example of a programmer created atomic block. For instance, the programmer may use an "atomic" keyword and two brackets, or other language constructs, to specify the code that should be executed atomically. In the atomic block illustrated below, a function foo( ) is called. As explained before, this function's entry and/or exit code might execute NHT operations.

```
atomic
{
    <code segment 1>
    foo( );   // performs NHT operation
    <code segment 2>
}
...
```

As noted above, compiler 220 may translate the atomic block source code to code that executes it atomically using the SpHT mechanism. The following pseudo-code represents one exemplary embodiment of the code that may be generated by compiler 220. Thus, the atomic keyword and brackets may be replaced with a call to initiate the split hardware transaction (e.g., SpHT_begin). Note that, as noted above, a fail address value is passed to the SpHT_begin function and also to the subsequent SpHT_resume function. Thus, if the code between SpHT_begin and SpHT_pause fails to execute atomically (e.g., because the hardware transaction executing it aborts), execution may resume at the "failed:" label. After initializing the split hardware transaction, the translated version of <segment 1> of the atomic block may be executed before pausing the split hardware transaction prior to calling the function foo( ). As shown in the exemplary pseudo-code below, after foo( ) returns, the split hardware transaction is resumed and the translated version of <segment 2> of the atomic block is executed. Additionally, since SpHT_resume is passed a fail address as well, if <segment 2> fails to execute atomically as part of the SpHT, execution may resume at the "failed:" label.

```
    SpHT_begin(failed)
    <translated segment 1>
    SpHT_pause( )
    foo( );   // performs NHT operation
    SpHT_resume(failed)
    <translated segment 2>
done:
    SpHT_commit( )
    goto after_atomic
failed:
    SpHT_failed( )
    goto done
after atomic:
...
```

Additionally, in some embodiments, the function foo( ) may also be translated to allow the body of the function to be executed within a hardware transaction. In the pseudo-code above, the split hardware transaction is paused prior to calling the function foo( ). Thus, as shown below, the code of foo( ) may be translated, such as by compiler 220, to resume the split hardware transaction, and therefore initiate a new hardware transaction after executing foo( )'s entry code but prior to executing the body of function foo( ). Also, function foo( ) may also pause the split hardware transaction prior to executing any exit code, according to one embodiment.

The first section of pseudo-code below may represent an original, such as programmer generated, version of function foo( ). Following that is a section of pseudo-code that may represent a translated, such as by compiler 220, version of function foo( ) that uses the SpHT mechanism to execute the atomic block atomically.

```
void foo( ) {
    <entry code>
    <body>
    <exit code>
}
void foo( ) {
    <entry code>
    SpHT_resume(foo_failed)
        <translated body>
    SpHT_pause( )
foo_exit:
    <exit code>
    goto foo_done
foo_failed:
    SpHT_failed( )
    goto foo_exit
foo_done:
}
```

For brevity, code related to retrying the transaction if the split hardware transaction fails to commit has been omitted from the above pseudo-code. In the exemplary pseudo-code above, SpHT_resume in function foo( ) is passed a different fail address than passed to SpHT_begin and SpHT_resume. Thus, if the function body fails to execute atomically, execution branches to the function exit code prior to returning to the calling function. Also, prior to returning to the caller, SpHT_failed is called, which notifies the SpHT mechanism that part of the SpHT failed and that a subsequent SpHT_resume executed by the caller must immediately fail.

Nesting of Transactions

The system and methods described herein for executing split hardware transactions may in some embodiments be exploited to support nesting of transactions within an atomic block of code. In some embodiments, the use of split hardware transaction techniques, as described above, in addition to the ability to save and restore checkpoints of the split transaction, may support both sequential and parallel nesting of transactions. For example, a checkpoint of the current read and write sets associated with an atomic block of code may be saved by pushing it onto a stack, writing it to a local memory buffer, or by other suitable means, in different embodiments, and may be restored in order to re-execute a failed child transaction without needing to re-execute its parent. Several examples of such techniques are described in more detail below.

Nested transactions may be employed in an application as a natural consequence of good software engineering. For example, a programmer may be given libraries for two shared data structures, and may integrate them to yield new atomic actions. This integration of structures is but one example of an application of closed nesting. In general, any situation in which one transaction is nested inside another and appears to take effect only when the enclosing transaction takes effect may be referred to as closed nesting of transactions. A simple implementation of such closed nesting may involve flattening each child transaction into its parent, which may be done in any transactional memory system using a simple thread-local counter. However, in such simple implementations, if any child transaction conflicts with another transaction, the parent typically must be aborted and rolled back as well. The system and methods described herein may in some embodiments be used to provide true closed nesting of transactions. In such embodiments, when a nested transaction aborts, only the nested computation may need to be retried.

Nested atomic blocks may define a hierarchy of code sequences. That is, when an atomic block is nested inside another, the inner block may be referred to as the child block and the outer block may be referred to as the parent block. The outermost atomic block may be referred to as the root block, and may not be nested inside any other. In embodiments in which split hardware transactions are exploited to support nested atomic blocks, when an execution of an atomic block is invalidated (for example, due to a conflict), only that block and its children may need to be retried.

A similar mechanism may support nested parallelism. In nested parallelism, a transaction may include forking to multiple child threads, which may in some embodiments be executed in parallel (in the absence of conflict) but which may appear to execute serially. In such embodiments, when all of the children complete execution, control may be returned to the original parent transaction, which may observe the effects of all of the children. For example, in one embodiment, each thread may use its own copy of its parent's checkpoint. Upon completion of two of more parallel nested child transactions, the checkpoints of any non-conflicting child transactions may be merged, and any conflicting child transactions may be re-run using the merged checkpoint. A similar mechanism may in some embodiments be used to speculatively parallelize a sequential loop. In such embodiments, the method may include guaranteeing that the children are serialized in a particular order. Various examples of serialization, merging of checkpoints, and conflict resolution are described in more detail below.

Figure 6:
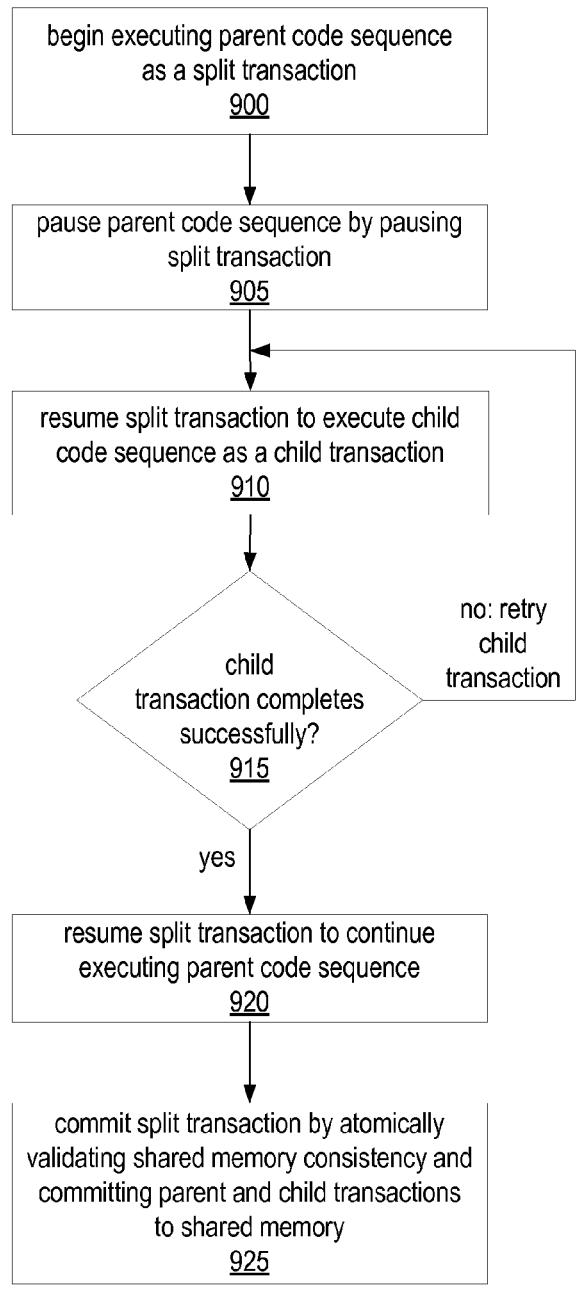
FIG. 6 is a flowchart illustrating one embodiment of a method for executing sequentially nested transactions.

In embodiments supporting sequential nesting, while a nested atomic block is executing, no other atomic block in the nested hierarchy may be executing. In other words, the entire nested hierarchy may be executed sequentially. In some embodiments, this may be achieved by executing the entire nested hierarchy using the same thread. FIG. 6 illustrates one embodiment of a method for executing sequentially nested transactions. In this example, an atomic block of code may include one or more child code sequences nested within a parent code sequence. The parent and/or child code sequences may each include one or more memory accesses (e.g., read accesses and write accesses) to a shared memory.

The method may include beginning execution of a parent code sequence (e.g., a code segment preceding a nested child sequence in program order) using a split transaction. This is illustrated in block 900. In various embodiments, the segment may be executed as a hardware transaction. This hardware transaction may execute write operations targeted to a shared memory as writes to a local memory rather than to the shared memory. In some embodiments, the hardware transaction may execute reads targeted to locations in the shared memory by copying the values from the shared memory to a corresponding location in the local memory (e.g., to a read set associated with execution of the atomic block). In other embodiments, the hardware transaction may execute a first read of any given location in shared memory by code in the atomic block as a copy from the shared memory location to a corresponding location in the local memory, and subsequent reads of the same location by code in the atomic block as reads of the local memory location.

Following execution of a segment of the parent code sequence, execution of the parent code sequence may be paused by pausing the split transaction, as shown in block 905. Pausing execution of the parent code sequence may also include saving a checkpoint of memory accesses performed so far by code of the atomic block. For example, the read and/or write set of the atomic block up to that point may be saved by pushing it onto a stack, writing it to a local memory buffer, or by other suitable means, in various embodiments.

As illustrated in FIG. 6, the method may include beginning a child code sequence as an atomic child transaction by resuming the split transaction. This is illustrated in block 910. Similar to the transaction used to execute the parent code segment, this transaction may execute its writes by writing to the local memory and its reads by reading from either the shared memory or the local memory, in different embodiments. If the child transaction does not complete successfully, shown as the negative exit from 915, it may in some embodiments be retried without having to re-execute any of the atomic block code that was executed prior to execution of the child transaction. This is illustrated as the path from decision block 915 to a point prior to block 910. As illustrated in this example, retrying a child transaction may include re-execution of a transaction to implement the failed child code sequence. In some embodiments, retrying the child code sequence may include restoring the read and/or write sets of the atomic block according to the checkpoint saved before initial execution of the child transaction. In this way, the child transaction may be re-executed consistent with the state of the execution of the atomic block up to, but not including, the failed child transaction. In other words, in such embodiments, the child transaction may be re-executed as if no read and/or write accesses targeted to the shared memory have been performed since the last checkpoint was saved.

A child transaction may fail for any of various reasons, including, but not limited to, a hardware transaction failure, a memory consistency validation failure, or a failure of an additional code sequence nested within the child code sequence itself. As described in more detail below, memory consistency failures may be handled differently than other types of failures. In some embodiments, determining if there has been a memory consistency validation failure includes determining if any values in locations in the shared memory targeted by read and/or writes of the child transaction (or of the overall atomic block) are different from corresponding values included in the read set of the atomic block. In other words, a memory consistency failure may reflect that values of one or more locations in shared memory read by code in the atomic block have been modified since they were read into the local memory. For example, code executed by another process, application, or thread may have modified one or more of the locations in the shared memory that are included in the read and/or write sets of the atomic block during execution of the child transaction or between the execution of parent code segment and the child code segment.

If the child transaction completes successfully (e.g., initially or upon retry), execution of the parent code sequence may resume, by resuming the split transaction. This is illustrated by the positive exit from block 915, and by block 920. In some embodiments, the checkpoint saved before beginning execution of the child transaction may be discarded and/or a new checkpoint (e.g., of the current read set and/or write set of the atomic block) may be saved upon successful execution of the child transaction (not shown). Resuming execution of the parent code sequence may include executing one or more additional segments of the parent code sequence (e.g., one or more code segments following the nested child sequence in program order) using the split transaction.

Once all parent transactions, child transactions, and any other code making up the atomic block have been executed, the split transaction may be committed to shared memory. In some embodiments, consistency with the shared memory may be validated for the entire atomic block, and if the memory consistency is successfully validated, the results of execution of the entire atomic block, including the parent code sequence and any child code sequences, may be committed to the shared memory atomically with the validation operation, as shown in 925. For example, in some embodiments, determining memory consistency and committing the results of execution to the shared memory may be performed by a single hardware transaction, thus guaranteeing atomicity while copying the results of the execution from the local memory to the shared memory. As described above, validating memory consistency for the atomic block may include determining if any values in targeted locations in the shared memory are different from corresponding values included in the read set of the atomic block. For example, code executed by another process, application, or thread may have modified one or more of the locations in the shared memory that are included in the read and/or write set of the atomic block during execution of one of the child transactions or parent code segment transactions, or between the execution of a parent code segment and a child code segment. In some embodiments, if the memory consistency validation fails at this point, execution of the entire atomic block may be retried or aborted. While memory consistency validation is illustrated in this example as taking place after execution of all child code sequences and segments of the parent code sequence, in other embodiments, validation of memory consistency may be performed at the beginning of a final child transaction, or at the beginning of a transaction executing a final segment of the parent code sequence, as part of the transaction itself (as described above regarding other embodiments of SpHT transactions). In such embodiments, committing the results of the entire atomic block may also be performed by this transaction, thus ensuring atomicity across the final validation and commitment operations.

Figure 7:
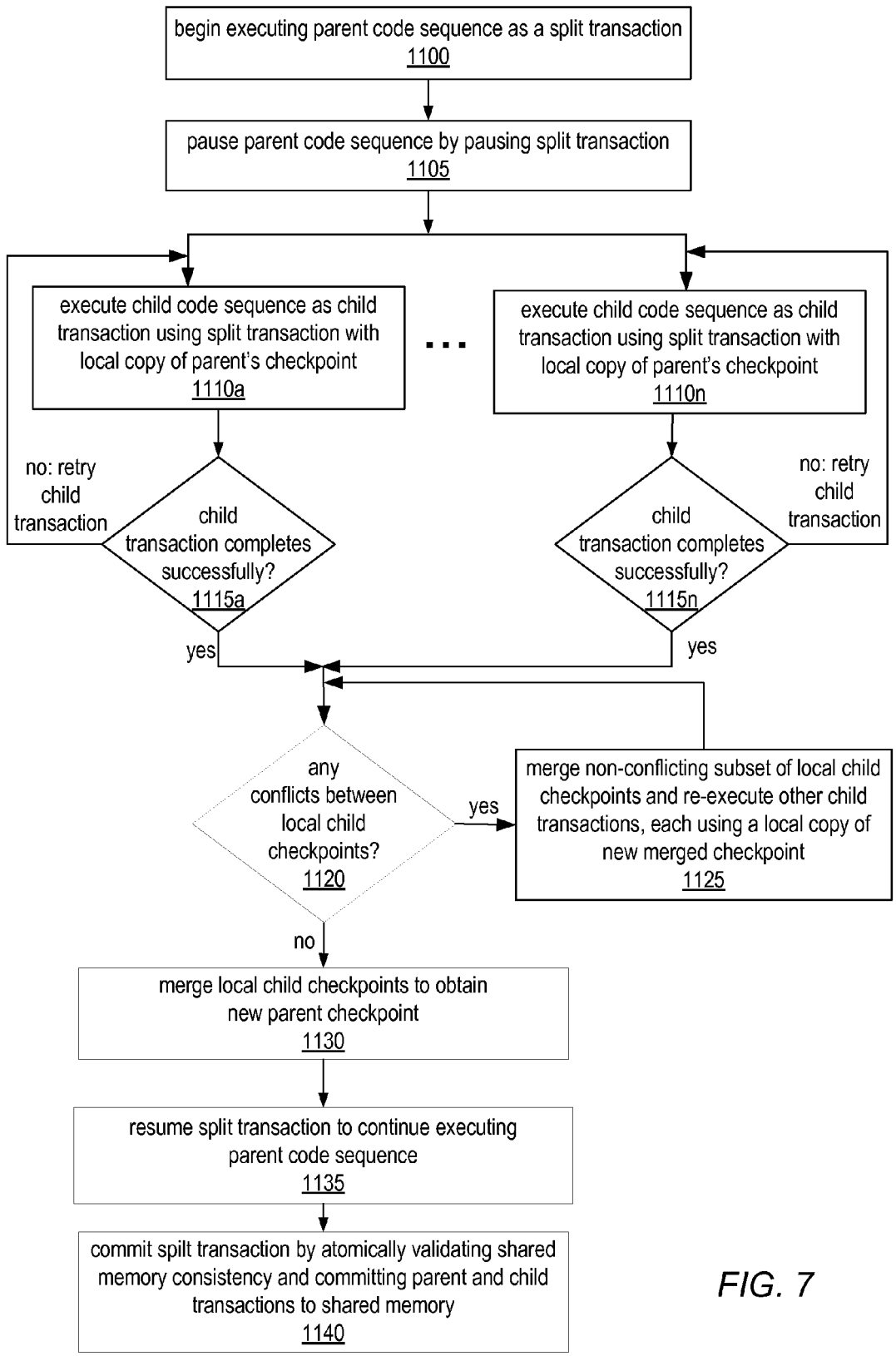
FIG. 7 is a flowchart illustrating one embodiment of a method for executing parallel nested transactions.

In parallel nesting of atomic blocks, a parent code sequence of an atomic block may include multiple child code sequences nested inside, coded to allow them to execute in parallel. The parent and/or child code sequences may each include one or more memory accesses (e.g., read accesses and write accesses) to a shared memory. FIG. 7 illustrates one embodiment of a method for executing such parallel nested transactions. As in the previous example, the method may include beginning execution of a parent code sequence (e.g., a code segment preceding the nested child sequences in program order) using a split transaction. This is illustrated in block 1100. In various embodiments, the segment may be executed as a hardware transaction. As described above, the hardware transaction may execute writes targeted to the shared memory by writing to a local memory instead, and may execute reads targeted to the shared memory by copying values from the shared memory to corresponding locations in the local memory, as described herein.

Following execution of a segment of the parent code sequence, execution of the parent code sequence may be paused by pausing the split transaction, as shown in block 1105.

As illustrated in FIG. 7, the method may include beginning execution of two or more parallel child code sequences, each implemented by a split transaction using its own local copy of the parent's checkpoint (i.e., its own copy of the read and write sets of the atomic block up to the point that the parent code sequence was paused). This is illustrated in blocks 1110a-1110n. Similar to the transaction used to execute the parent code segment, these transactions may execute writes targeted to shared memory as writes to a local memory instead and may execute reads of the shared memory by copying values from the shared memory to the local memory. If one or more of the child transactions does not complete successfully, shown as the one of the negative exits from 1115a-1115n, that particular child transaction may in some embodiments be retried without having to re-execute any of the atomic block code that was executed prior to execution of the child transaction or any of the other child transactions. This is illustrated as a path from one of the decision blocks 1115a-1115n to a point prior to its corresponding block 1110a-1110n. As described above, retrying a child transaction may include re-execution of a transaction to implement the failed child code sequence. In some embodiments, retrying the child code sequence may include restoring the checkpoint by making a new local copy of the parent's checkpoint. In this way, the child transaction may be re-executed consistent with the state of the execution of the atomic transaction up to, but not including, the failed child transaction. In other words, in such embodiments, the child transaction may be re-executed as if no read and/or write accesses targeted to the shared memory have been performed since the execution of the child transaction was spawned (e.g., since the thread executing it was spawned).

Again, a child transaction may fail for any of various reasons, including, but not limited to, a hardware transaction failure, a memory consistency validation failure, or a failure of an additional code sequence nested within the child code sequence itself, but memory consistency failures may be addressed differently than other types of failures. In some embodiments, determining if there has been a memory consistency validation failure includes determining if any values in locations in the shared memory are different from corresponding values included in the read set of the atomic block. In other words, a memory consistency failure may reflect that values of one or more locations in shared memory read by code in the atomic block have been modified since they were read into the local memory. For example, code executed by another process, application, or thread may have modified one or more of the locations in the shared memory that are included in the read and/or write set of the atomic block during execution of the child transaction or between the execution of parent code segment and the child code segment.

If all of the child transactions complete successfully (initially or upon retry), their local checkpoints (i.e., the local read and write sets used by each of the child transactions) may be compared to determine if there are any conflicts between them, as shown in decision block 1120. In some embodiments, the checkpoints may be augmented with additional information to detect these conflicts. If there are no conflicts between the local child checkpoints, shown as the negative exit from block 1120, they may be merged to obtain a new parent checkpoint, as shown in block 1130. If, however, there are conflicts between any of the local child checkpoints, shown as the positive exit from 1120, any non-conflicting subsets of the local child checkpoints may be merged and one or more child transactions having conflicting local checkpoints may be re-executed using the new merged checkpoint. This is illustrated as block 1125 and a feedback loop from block 1125 to the point immediately preceding block 1120. Checkpoint conflict resolution and merging are described in more detail below.

Once any conflicts have been resolved (or if none were determined), execution of the parent code sequence may resume by resuming the split transaction using the new parent checkpoint. This is illustrated as block 1135. In this example, the local child checkpoints may be discarded at this point. Resuming execution of the parent code sequence may include executing one or more additional segments of the parent code sequence (e.g., one or more code segments following the nested parallel child sequences in program order) using the split transaction. If, on the other hand, one or more child transactions fail to successfully complete, the parent transaction may fail and the parent atomic block may be retried in its entirety or aborted, in different embodiments (not shown).

Once all parent transactions, child transactions, and any other code making up the atomic block have been executed, the split transaction may be committed to shared memory. In some embodiments, consistency with the shared memory may be validated for the entire atomic block, and if the memory consistency is successfully validated, the results of execution of the entire atomic block, including the parent code sequence and any child code sequences, may be committed to the shared memory atomically with the validation operation, as shown in 1140. For example, in some embodiments, determining memory consistency and committing the results of execution to the shared memory may be performed by a single hardware transaction, thus guaranteeing atomicity while copying the results of the execution from the local memory to the shared memory. As described above, validating memory consistency for the atomic block may include determining if any values in targeted locations in the shared memory are different from corresponding values included in the read set of the atomic block. For example, code executed by another process, application, or thread may have modified one or more of the locations in the shared memory that are included in the read and/or write set of the atomic block during execution of one of the child transactions or parent code segment transactions, or between the execution of a parent code segment and a child code segment. In some embodiments, if the memory consistency validation fails at this point, execution of the entire atomic block may be retried or aborted. While memory consistency validation is illustrated in this example as taking place after execution of all child code sequences and segments of the parent code sequence, in other embodiments, validation of memory consistency may be performed at the beginning of each child transaction, and/or at the beginning of a transaction executing a final segment of the parent code sequence, as part of the transaction itself (as described above regarding other embodiments of SpHT transactions). In such embodiments, committing results of execution of the entire atomic block may also be performed by the last of these transactions, thus ensuring atomicity across the final validation and commitment operations.

Note that in various embodiments, different types of nesting may coexist within the same atomic block and be supported by the system and methods described herein. That is, an atomic block (not necessarily the root) may spawn some nested child blocks for parallel execution and may execute others sequentially. Various methods for using a variant of the SpHT mechanism to implement sequential and parallel nesting of atomic blocks are described in more detail below.

Sequential Nesting

To support true nesting of atomic blocks, the system and method may allow the execution of a nested atomic block to be aborted and retried if it is invalidated (for example, due to a conflict), without aborting the execution of the parent block. In some embodiments, this may be implemented by executing the hierarchy of nested atomic blocks using a SpHT, with a child block being executed by one or more different segments than its parent block. The following pseudo-code illustrates one such example:

```
atomic {                        // begin SpHT
    // pre child block code     // segment 1 of SpHT: execute pre child block
                                   code
    atomic {                    // pause and resume SpHT
        // child block code )   // segment 2 of SpHT: execute child block code
    }                           // pause and resume SpHT
    // post child block         // segment 3 of SpHT: execute post child block
    code                          code
}                               // commit SpHT
```

In general, the above schema may be implemented using SpHT techniques as follows:

1. Begin an SpHT and start executing the root block.
2. When encountering a child block, pause the SpHT and save the current checkpoint (e.g., including the read and/or write sets).
3. Resume the SpHT to execute the child block (which begins a new segment). When execution of the child block is complete, pause the SpHT.
4. To retry the child block's execution (e.g., upon failure of the child block or validation), restore the checkpoint saved in Step 2 and go to Step 3.
5. When the execution of the child block succeeds, resume the SpHT and continue executing the parent block. At this point, the checkpoint saved in Step 2 can be discarded and the execution of the parent block continues with the checkpoint that includes the updates done during execution of the child block.

As the above schema shows, a nested atomic block may terminate a segment in the parent block and begin a new one in the child block. The idea is simple: since a child block is executed in different segments than those executing the parent block, and since its execution only affects the state of the checkpoint, the execution of the child block may be retried as long as the checkpoint can be restored to its state before the failed execution.

To support a nesting depth greater than 1 (e.g., so that a parent of a child block can itself be nested inside another block), the system and methods described herein may support the ability to save and restore more than one pending checkpoint, in some embodiments. In such embodiments, the sequential nesting algorithm may maintain a stack of checkpoint states. For example, to save the checkpoint before executing a nested block (Step 2 in the above schema), the method may include pushing its state to the top of the stack (SpHT_push). Similarly, to retry the execution of the child block (Step 4), the checkpoint may be restored to the state at the top of the stack (SpHT_restore). In this example, when the child block is finished executing (Step 5), the saved checkpoint may be discarded by popping the state at the top of the stack (SpHT_pop). In this way, the method may maintain the invariant that the state at the top of the stack when a block is executed corresponds to the checkpoint right before the first segment of that block began executing. Therefore, in order to retry the current block, the method may simply restore the checkpoint to the state at the top of the stack. To retry the parent of the current block, the method may include first discarding the state at the top of the stack, and then restoring the checkpoint to the state that replaces it at the top of the stack.

Figure 8A:
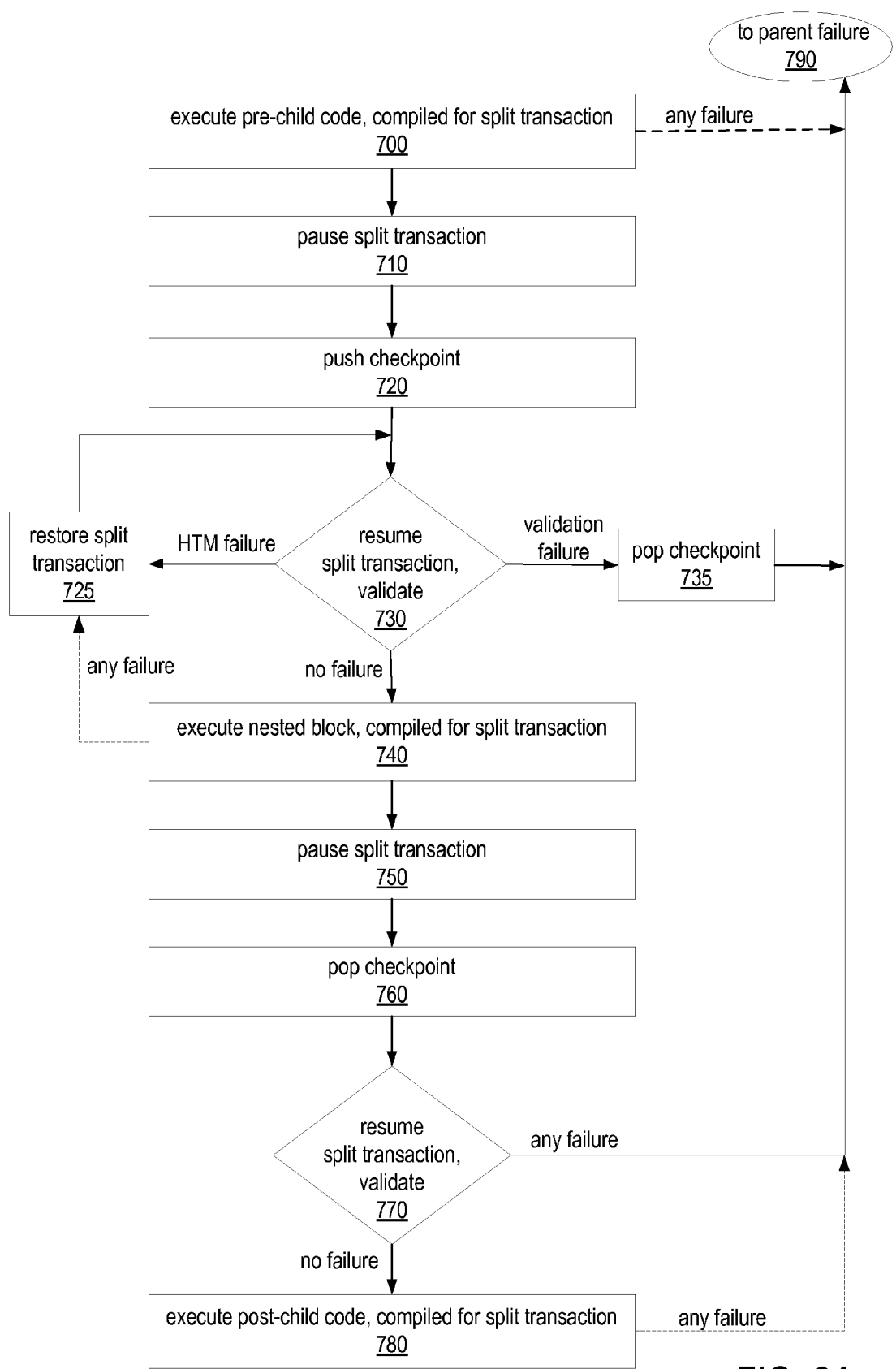
FIG. 8A is a flowchart illustrating one embodiment of a method for executing nested atomic blocks using split hardware transactions.

FIG. 8A illustrates one embodiment of a method for using the SpHT mechanism to execute a nested atomic block according to the above schema. As shown in block 700, the method includes executing the code preceding the nested block using the (already running) split transaction. Before executing the nested block, the split transaction may be paused (as shown in block 710), and a checkpoint may be pushed on the stack (as in block 720). As described above, this maintains the invariant that the state at the top of the stack is that of the checkpoint at the beginning of the currently executing atomic block. The method may then include resuming the SpHT (as in block 730), and if there is no hardware transaction failure or validation failure, executing the nested block code using the SpHT (as in block 740).

If the execution of the nested block succeeds, shown as the fall-through (i.e., bottom) exit from 740, the method may include pausing the SpHT again as in block 750, popping (and discarding) the state at the top of the stack as in block 760 (which is the state pushed at block 720 before the nested block started executing), and resuming the SpHT (as in block 770) in order to execute the rest of the parent atomic block (as in block 780). In this example, pausing the split transaction at block 750 may include committing the results of execution of the child block to the local memory space.

If the read validation done by that SpHT_resume fails (illustrated as the right exit from block 730), indicating that a conflict was found with a memory access done by a previous segment in an ancestor block, then the ancestor block may need to be retried. In such cases, the method may include popping the state at the top of the stack (as in block 735) and passing control to the parent block, indicating that the parent failed and should be retried. This is illustrated as the path from block 735 to 790. Note that returning to a parent failure (shown as 790) may in some embodiments involve returning to a point in a parent code sequence flow similar to that illustrated in block 725, and then resuming execution of the parent block sequence in a manner similar to the description of blocks 730-780. If, however, the execution of the nested block fails for any other reason, shown as an alternate exit from block 740 or the left exit from block 730, the method may include restoring the checkpoint that was in effect when the nested transaction began (as shown in block 725), then returning control to the SpHT_resume at block 730 so that the nesting block may be retried.

One key feature of SpHT is that at any point a hardware transaction that is executing a segment may be committed without violating the isolation property of the executing split transaction. This may enable the system to distinguish between the two kinds of failures illustrated at block 730, even if the underlying HTM does not support reporting an error code upon a hardware transaction failure. For example, if at block 730, the read set is found to be invalid, the method may simply include committing the hardware transaction and passing control to block 735. Alternatively, when a hardware transaction fails at block 730, control may simply be passed to the failure address of this segment.

Note that while FIG. 8A illustrates only one level of nesting, the same techniques may be applied when the parent block itself is nested. In particular, when a conflict with an ancestor is found (at block 730) and control is passed to the parent block (denoted by 790), the parent might still fail to resume if the conflict that was found is with an older ancestor.

This is because the read set at the beginning of the parent's execution may still contain the invalid address. In this case, the parent may pop another state of the stack and pass control to its own parent (not shown), and so on, until a valid checkpoint is found.

Various optimizations of the basic techniques described herein may be applicable to a given embodiment, depending on the particular checkpoint implementation and the underlying HTM support employed. For example, in some embodiments, the read set may be configured to indicate the start address of the block that first inserts a given entry. In such embodiments, it may be possible for a nested block to transfer control directly to the ancestor with which the conflict was detected without going through all the parent blocks in between. In another embodiment, the underlying HTM may supply the address that caused a hardware transaction to abort, allowing SpHT_resume operations like the one at block 730 of FIG. 8A (or block 830 of FIG. 8B) to quickly determine that a conflict was found with an ancestor block, without validating the entire read set.

Note that in some embodiments, it may not always be necessary to explicitly restore a checkpoint to the state at the top of the stack before retrying a block, as long as segments use the hardware transaction executing it for all modifications of the checkpoint. In this case, when the segment fails because the hardware transaction aborts, all modifications to the checkpoint are undone. To re-execute a segment when the hardware transaction executing it aborts, the method may include simply passing control to the SpHT_resume at the beginning of the segment, without restoring the checkpoint. In another example, when the first segment of a nested atomic block fails and needs to be re-executed, the method may include retrying the block by passing control to the SpHT_resume at the beginning of that block, without restoring the checkpoint. In this example, the state of the checkpoint may only need to be restored when re-executing a failed transaction corresponding to a segment other than the first segment. In such embodiments, when other segments of an atomic block fail, the checkpoint may need to be restored to the state at the top of the stack before retrying them, in order to undo the modifications done by previous segments of the block.

Implementation and Interface

Since a checkpoint may be thread-local, as described herein, any persistent data structure may be used to save and restore the parent checkpoint around a child block, in various embodiments. For example, a very simple but wasteful solution may be to save a complete copy of the checkpoint on every backup operation, but more efficient solutions may also exist. The specific persistent data structure to be used may vary from one implementation to another, and even from one atomic block to another. For example, if an application includes a deep hierarchy of short atomic blocks, an implementation that optimizes the backup and restore operations may be appropriate, while for longer atomic blocks one that optimizes the SpHT_read and SpHT_write operations may be more suitable. Note that the read and write sets are typically two of the components of the checkpoint which need to be backed-up or restored, and they may be accessed each time a segment reads or writes shared memory.

Different embodiments of the system and methods described herein may employ different mechanisms for passing control between a child block and its parent. As described above, a child block may need to pass control back to its parent both when it has successfully completed execution, or when the SpHT_resume operation that begins its first segment finds the read set invalid. In the first case, execution may proceed in the segment following the nested block; in the second, control may be passed to the first segment of the parent block, since the entire parent block may need to be retried. There are many alternatives of how such a control flow may be implemented.

In one embodiment, exceptions may be used to facilitate such non-local control flows. In such embodiments, when SpHT_resume finds the read set invalid, it may induce an exception. A "try" block may ensure that an exception induced by the first segment of a nested block is caught in the context of the parent block, while an exception induced by any other segment of a nested block may be caught in the context of the nested block. This mechanism may guarantee that the nested block passes control to its parent only when the conflict found is with a segment that is not part of that nested block. In another embodiment, SpHT_resume may be provided with two fail addresses: one to which the flow branches when a conflict is found with the parent block, and another to which the flow branches when a conflict is found with an access done by the current block.

Figure 8B:
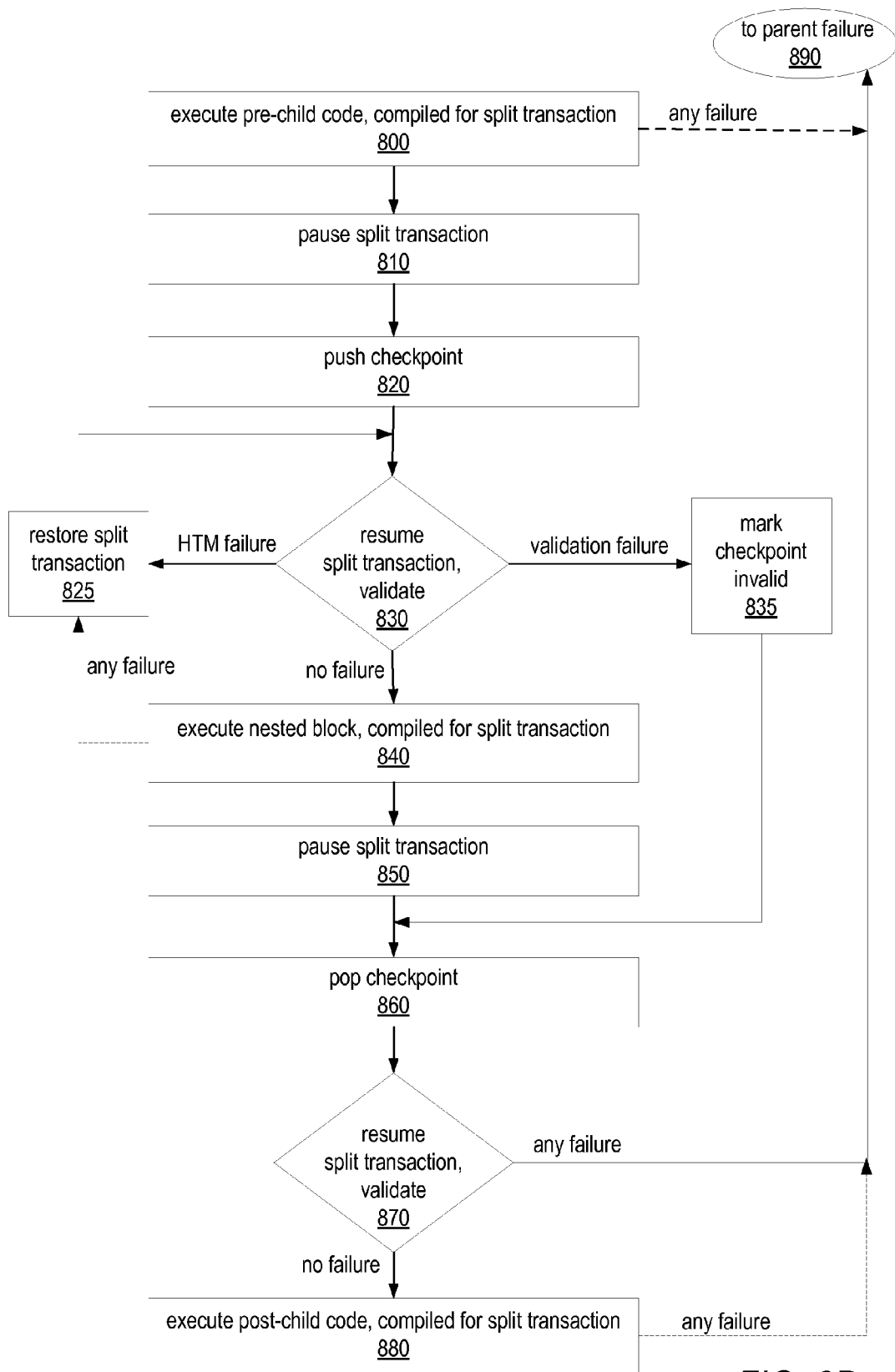
FIG. 8B is a flowchart illustrating a second embodiment of a method for executing nested atomic blocks using split hardware transactions.

In yet another embodiment, control may always be transferred to the segment succeeding the nested block, even when the nested block execution fails due to a conflict found with the parent transaction. In order for the parent block to know whether the child block was executed successfully, the checkpoint may be marked as being invalid if a child block finds it invalid, and validation of a checkpoint marked as invalid may fail. In such embodiments, the invalid mark may be cleared every time a checkpoint is restored from the stack (or a new split transaction is begun). FIG. 8B illustrates a control flow, according to one such embodiment. In this example, blocks 800-830 and 840-880 are similar to blocks 700-720 and 740-780, respectively, of FIG. 8A. However, in this example, when a nested block finds the checkpoint is invalid (shown as the right exit from block 830), the method may include marking the local checkpoint as invalid (as in block 835), and passing control to block 860, which pops the state at the top of the stack and proceeds to the parent block as if the nested child block is finished executing. Note, however, that since the checkpoint is now marked invalid, the SpHT_resume operation at block 870 must fail, and the parent block may retry (after it restores the appropriate state and clears the invalid mark). As illustrated in FIG. 8B, this control flow includes only one path back to a parent failure (at 890), as opposed to the multiple paths to a parent failure of the control flow illustrated in FIG. 8A. Having only one fail path may in some embodiments support a simpler compilation of code to implement the control flow.

As noted above, an interface may be provided to support split hardware transactions that includes operations such as SpHT_begin, SpHT_read, SpHT_write, SpHT_pause, SpHT_resume, and SpHT_commit. In order to support closed nesting of atomic blocks, the interface may be extended to include additional functionality, such as by including the following operations:

SpHT_resume(fail_address): Resume the split transaction; if validation fails, commit the hardware transaction and mark the checkpoint as invalid. Use fail_address as the hardware transaction failure address.

SpHT_push( ): Saves and pushes the current state of the checkpoint on the stack.

SpHT_restore( ): Restores the checkpoint to the state at the top on the stack. Clears the checkpoint's invalid mark if set.

SpHT_pop( ): Pops the top state off the stack.

SpHT_checkpoint_unmarked( ): Return true if and only if the current checkpoint has not been marked as invalid.

Detailed Examples

The following pseudo-code illustrates how a child block may in some embodiments be executed with a SpHT, according to the schema and interface described above:

```
SpHT_pause( );                      // pause parent's execution
    SpHT_push( );                   // save and push checkpoint onto
                                       stack
    goto nested_start;
nested_failure:
    SpHT_restore( );                // when nested code fails
                                    //restore pushed checkpoint
nested_start:
    SpHT_resume(nested_failure);    // begin nested execution
    if (SpHT_checkpoint_unmarked( )) {   // if validation succeded
        <nested code>
        SpHT_pause( );              // end nested execution
    }
    SpHT_pop ( );                   // pop and discard checkpoint on
                                       stack
SpHT_resume (parent_failure);       // resume parent transaction
if (!SpHT_checkpoint_unmarked( ))   // if checkpoint has been
                                       invalidated
    goto parent_failure;            //retry whole parent transaction
```

In this example, the initial SpHT_pause and final SpHT_resume and what follows occur in the context of the parent; the remaining operations are all in the child context. After execution of the parent's block is paused, the checkpoint is saved and pushed onto the stack before beginning execution of the child block. In this example, the SpHT_restore operation is skipped over, and execution of the first segment of the child block begins. If the hardware transaction executing that segment fails, the checkpoint is restored and the nested operation is retried by branching to nested_failure. Otherwise, if SpHT_resume successfully validated the checkpoint, the checkpoint will not have been marked and SpHT_checkpoint unmarked will be true. In this example, if the checkpoint is valid, the nested code is executed, the split transaction is paused, and checkpoint may be popped off the stack (remaining unmarked). In this example, in either case, control may return to the parent context, which may attempt to resume execution. If the checkpoint has already been marked invalid, the validation in the final SpHT_resume operation will fail, which will cause the subsequent test to retry the parent transaction. Otherwise, the parent transaction will resume. In this example, any failure at this point may cause a retry of the parent transaction.

In some embodiments, the above schema may be recursively applied to <nested code> if it is itself a parent of another child block. Exemplary pseudo-code, shown below, illustrates three atomic blocks nested inside each other. In other words, this example illustrates an implementation two-deep nesting using the SpHT mechanism. The first pseudo-code segment represents user code:

```
atomic {
    <segment 1>;
    atomic {
        <segment 2>;
        atomic {
            <segment 3>;
        }
        <segment 4>;
    }
    <segment 5>;
}
```

The second pseudo-code segment represents the translation of this code so that it exploits the SpHT mechanism, as described herein:

```
begin_root:
    SpHT_begin(root_begin);
    <translated segment 1>;
    SpHT_pause( );
        SpHT_push( );
        goto begin_nested_1;
    nested_1_failed:
        SpHT_restore( );
    begin_nested_1:
        SpHT_resume(nested_1_failed);
        if (SpHT_checkpoint_unmarked( )) {
            <translated segment 2>;
            SpHT_pause( );
                SpHT_push( );
                goto begin_nested_2;
            nested_2_failed:
                SpHT_restore( );
            begin_nested_2:
                SpHT_resume(nested_2_failed);
                if (SpHT_checkpoint_unmarked( )) {
                    <translated segment 3>;
                    SpHT_pause( );
                }
                SpHT_pop( );
            SpHT_resume(nested_1_failed);
            if (!SpHT_checkpoint_unmarked)
                    goto nested_1_failed;
            <translated segment 4>;
            SpHT_pause( );
        }
        SpHT_pop( );
    SpHT_resume (root_failed);
    if (!SpHT_checkpoint_unmarked) goto begin_root);
    <translated segment 5>;
    SpHT_commit( );
    ...
```

In the example above, the user code is divided into segments, which correspond to code executed before, during, and after each nested block. Note that each of these segments may be translated to use the SpHT_read and SpHT_write operations for all shared memory accesses (not shown).

Skip Checkpoint Backup/Restore for Single-Segment Blocks

In some embodiments, it may be possible to skip the backup/restore operation of the checkpoint if the nested block consists of only one segment. In such embodiments, if the SpHT_read and SpHT_write operations modify the checkpoint using transactional writes, the checkpoint will not be modified if the segment fails (since that means that the hardware transaction executing this segment fails). Examples of such blocks include leaf atomic blocks (e.g., blocks that contain no further nested blocks) that do not contain any operations that require breaking their execution into multiple segments. Since the block contains only one segment, there is no need to backup and restore the checkpoint before and after the block's execution, since the checkpoint will not be changed by failed executions of the block.

In some embodiments, such an optimization may be achieved, for example, by extending the interface to include different versions of the SpHT_push, SpHT_restore and SpHT_pop operations for nested blocks that have only one segment. For example, these different versions may simply execute as a "no-op" in systems in which the SpHT_read and SpHT_write operations update the checkpoint using only transactional writes. Such an extension may in some embodiments permit a compiler to generate code for the SpHT mechanism to indicate that this optimization is possible, without the programmer knowing the implementation details of SpHT_read and SpHT_write.

Nesting the Commit Operation

The SpHT_commit operation, as described herein, may copy all values from the local write set to the appropriate shared memory locations using a hardware transaction, in some embodiments. In some embodiments, this copy operation may be executed as part of the hardware transaction that executes the last segment in the atomic block, thus saving an additional hardware transaction and validate operation. Note that the hardware transaction that commits the SpHT is also obliged to validate the checkpoint. In other embodiments, the copyback operation may be executed in a segment of its own. In other words, in some embodiments, the copyback operation may be executed as its own dedicated hardware transaction, thus allowing the copyback operation to be retried upon a failure without the need to retry the execution of the last segment of the atomic block. Such an embodiment may be well suited for use in executing an atomic block whose code includes writes to a few contended locations that it does not read. Execution of such code may cause frequent invalidations during the copyback operation (due to conflicts on the written locations) while the SpHT's checkpoint is still valid (because other locations read by the SpHT are not changed). In some embodiments, both implementations of the commit operation may be supported, and the method may include switching from one implementation to the other when contention is encountered, depending on the particular circumstances.

Parallel Nesting

For purposes of illustration, a language having simple fork/join parallelism may be assumed, notated as follows:

```
        <A>
        fork {
            <B>
        } and {
            <C>
        }
```

In this illustration, code <A> executes completely before <B> or <C> begin execution. Subsequently, code <B> and code <C> run in two separate threads, T<B> and T<C>, and their execution may be permitted to overlap. When both threads have completed execution, control may be returned to the original thread and <D> may be run. In this illustration, threads T<B> and T<C> may be referred to as "spawned threads", and the thread that runs the parent transaction may be referred to as the "spawning thread" or the "parent thread".

While it is typically not legal code construction to use a "fork" within an atomic block, this concept may be used to define the behavior of a construct referred to as "forkatomic". The following pseudo-code illustrates the use of such a construct for parallel nesting:

```
        atomic {
            <A>
            forkatomic {
                <B>
            } and {
                <C>
            }
            <D>
        }
```

In the example above, <B> and <C> may be executed in parallel, but will behave atomically with respect to one another. In other words, to any observer, this atomic block will behave like one of the following two atomic blocks:

```
        atomic {
            <A>
            <B>
            <C>
            <D>
        }
        atomic {
            <A>
            <C>
            <B>
            <D>
        }
```

In order to provide this behavior, the system and methods must detect and handle conflicts between threads T<B> and T<C>, in addition to dealing with conflicts with any code executing outside the transaction. This is because when running threads in parallel, a read of an address by one of the threads will not see the result of a write to that address by the other. For example, if T<B> reads an address written by T<C>, and T<C> reads an address written by T<B>, then it might not be possible to run the two in parallel (e.g., since one block must appear to be executed after the other, and hence see the result of the other's writes). Therefore, while sequential nested transactions may only need to track read addresses that were not already read by the parent transaction, parallel nested transactions may need to track all addresses they access for later conflict detection with parallel executed threads. In the example above, when both threads have completed successfully without mutual conflict, their read and write sets may be merged with those of the parent.

Note that some embodiments may support the mixing of parallel and sequential nesting to an arbitrary depth. In the example above, each of the blocks <A>, <B>, <C> and <D> may itself contain sequential or parallel nested transactions. In some embodiments, the SpHT sequential nesting algorithm may be extended to support such a mixture of sequential and parallel nesting.

Spawning and Running a Parallel Nested Transaction

In some embodiments, tracking for conflict detection of all read and write accesses performed by a thread may be done in separate read and write sets than the read and write sets of the SpHT checkpoint that are used for write logging and read validation. These additional sets may be referred to as the thread's read and write logs. These sets may in some embodiments be used only for conflict detection (e.g., to decide the serialization order for the threads.) In other words, they may be used in determining which of the two spawned threads should appear to be executed before the other, as described in more detail below. One skilled in the art will appreciate many other alternatives for tracking conflict detection. For example, in one embodiment, a thread id may be added to entries in the regular SpHT read and write sets, allowing detection of conflicts between parallel threads without requiring that each thread maintain such additional read and write logs.

As is the case with sequential nesting, before executing a nested transaction, the parent transaction may be paused, and the state of the checkpoint may be pushed on a stack. With parallel nesting, however, a spawned thread T<B> may never execute an atomic block that is not nested in <B>. In some embodiments, a conflict with an ancestor of <B> may be reported when T<B> terminates, and conflicts with a parallel spawned thread may only be detected by the spawning thread after the spawned threads terminate. Since a thread may only need to restore its checkpoint to states that it pushes, or to the state at the point at which it was spawned, in some embodiments, a thread may be spawned with a copy of the parent checkpoint and a new fresh stack that only contains the state of that checkpoint. For example, the following pseudo-code may represent user code:

```
forkatomic {
    <B>
} and {
    <C>
}
```

The user code above may in some embodiments be executed as follows:

fork {
1. checkpoint=Parent thread's checkpoint
2. SpHT_push (on T<B>'s empty stack)
3. Run <B> as a sequentially nested transaction
4. If checkpoint is invalid, set T<B>'s return status to failed, otherwise set it to succeeded
} and {
1. checkpoint=Parent thread's checkpoint
2. SpHT_push (on T<C>'s empty stack)
3. Run <C> as a sequentially nested transaction
4. If checkpoint is invalid, set T<C>'s return status to failed, otherwise set it to succeeded
}
ConflictsAndMergeManagement( )

Note that the operation represented as "ConflictsAndMergeManagement", above, will be described in more detail later.

Spawning each thread with its own stack and checkpoint may in some embodiments allow it to access them without synchronizing them with any other threads, and may allow the implementation of the stack and/or checkpoint to be relatively simple and efficient. In some embodiments, each thread may manipulate its stack in the same way as with the sequential algorithm. In particular, when a state is found invalid, it may be popped from the stack, and the next state may be tested. If, however, the last state on the thread's stack is popped after being found invalid, the thread may terminate with an error code, indicating to the spawning thread that the parent block should be retried.

Since the read and write sets of a spawned thread's checkpoint contain entries for the read and write addresses targeted by all ancestor transactions, the SpHT_read and SpHT_write operations may in some embodiments manipulate these sets in exactly the same way as if the transaction was nested sequentially. In addition, each thread may update its read and write logs as follows:

A SpHT_write operation adds the written address to the thread's write log.
A SpHT_read operation adds the read address to the thread's read log if and only if it is not already in the thread's write log.

Note that unlike the read and write sets, these read and write logs may not be required to contain the read and written values, but may only include the addresses, in some embodiments.

Updates to the read and write logs may in various embodiments be done either before or after the updates to the regular read and write sets, or the two updates may be combined. For example, in SpHT_read, if an address is in the thread's write log, updating both the read log and read set may be skipped, without checking whether the address is also in the write set. One skilled in the art will appreciate that, depending on the implementation of the checkpoint and log sets, other methods to combine these two updates may be available, resulting in more efficient SpHT_write and SpHT_read operations. Also, in some embodiments, SpHT_push and SpHT_pop operations may also push and pop the state of the read and write logs to and from the stack (and the state of these logs may be restored as well whenever SpHT_restore is called). As described in more detail below, this may not be necessary for correctness, as the algorithm may in some embodiments run correctly (but perhaps not as efficiently) even if the logs contain some additional addresses that the thread did not access, as long as all addresses that it did access are included. Note that in general, the remaining SpHT operations (those not discussed above) may not be substantially modified for parallel nesting.

Merging and Conflict Detection

When two threads spawned by a forkatomic finish executing, control may return to the spawning thread, which first checks their exit code. Only if both threads finished successfully, without indicating that the parent transaction should be re-run, may the merge and conflict detection operation proceed. Otherwise, the parent transaction may be re-run (as with the sequential algorithm) by restoring the read and write sets' state using SpHT_restore, and transferring control to the SpHT_resume operation that begins the parent transaction. Note that when the parent transaction is retried, it may in some embodiments execute the forkatomic again.

If both threads finish successfully, the method may include determining whether the two conflict with each other. In some embodiments, this may be accomplished using their read and write logs. Note that while each of the threads has seen all writes done by its parent, neither of the threads has seen a write done by the other (because both threads were spawned with their own private copy of the parent's checkpoint). Therefore, if one thread executed a read from an address written by the other, that thread must be serialized before the other. Hence, there is a conflict if both threads have done at least one read from an address written by the other, as illustrated in the following example:

ConflictsAndMergeManagement( )=
A_before_B=overlaps (T<B>'s write log, T<A>'s read log)
B_before_A =overlaps (T<A>'s write log, T<B>'s read log)
ConflictDetected=A before B && B before A In the illustration above, if T<B>'s write log overlaps T<A>'s read log, then A_before_B is true. Similarly, if T<A>'s write log overlaps T<B>'s read log, then B_before_A is true. A conflict is detected (e.g., ConflictDetected is true) when both A_before_B and B_before_A are true. If such a conflict is detected, the atomic block executed by one of the threads must be re-run, this time with a read and write set that contains the updates done by the other. In other words, to resolve the conflict, the two blocks may be treated as if they were nested sequentially in the parent block in some order, and the block that appears second in this order may be re-executed. The order in which the blocks take effect, which dictates the way the write sets are merged, may be determined by the flags A_before_B and B_before_A as follows:

```
if (ConflictDetected)
    // the transactions cannot be serialized without re-running one of
    them.
    // <B> is arbitrarily chosen to be re-run; choosing <A> is equally
    valid.
    <ReadSet, WriteSet> ← <T<A>'s ReadSet, T<A>'s WriteSet>
    <ReadLog, WriteLog> ← <ReadLog ∪ T<A>'s ReadLog,
        WriteLog ∪ T<A>'s WriteLog>
    // Re-Run <B> as a sequentially nested transaction
else
    ReadSet ← T<A>'s ReadSet ∪ T<B>'s ReadSet
    if (B_before_A)
        // No conflict detected, but <B> needs to take effect before <A>
        WriteSet ← SerializeSiblings(T<B>'s WriteSet, T<A>'s WriteSet)
    else
        // No conflict detected, but <A> needs to take effect before <B>
        // or the order doesn't matter
        WriteSet SerializeSiblings(T<A>'s WriteSet, T<B>'s WriteSet)
    ReadLog ← ReadLog ∪ T<A>'s ReadLog ∪ T<B>'s ReadLog
    WriteLog ← WriteLog ∪ T<A>'s WriteLog ∪ T<B>'s WriteLog
```

In the code above, if there is a conflict and it is decided to re-run <B>, then <B> is re-run using T<A>'s checkpoint, as if it were sequentially nested after <A>. Note that in this case, there may be no need to merge T<A>'s checkpoint with that of the parent, since T<A> was spawned with a copy of the parent's checkpoint, and only new entries have been appended to it. Thus, its checkpoint may correspond to a run in which <A> was sequentially nested in the parent at the point that T<A> was spawned.

Note that ConflictAndMergeManagement may in some embodiments unify the read and write logs of a spawned thread that completed successfully (and is not re-run) with those of the spawning thread. This may be necessary because the spawning thread may itself be a result of a forkatomic, and therefore locations accessed by the spawned thread may be needed again when checking for conflicts when the spawning thread terminates.

If no conflict is detected, the checkpoints of the two threads may be merged. Merging of the read sets may be performed as a simple union of the sets, as no entry in the read set of the block that is serialized second appears in the write set of the block that is serialized first, in this example. Note that when taking the union of the read sets of the spawned threads, two entries may be introduced for the same address containing different values. In some embodiments, this may occur if the two spawned threads each read a previously-unaccessed address, but its contents change between these two reads. If this happens, the read set may be found invalid when the parent transaction resumes and validates its checkpoint, and the parent transaction may then be retried. In such cases, the SpHT_restore operation may discard the read set having duplicate entries.

Merging the write sets may in some embodiments depend on the execution order of sibling threads, as later writes override previous writes to the same address. The procedure to merge the two write sets of sibling threads may be as follows:

```
SerializeSiblings(W1,W2) =
    WMerged ← W2
    for each (addr, value) ∈ W1 \ (W1 ∩ W2) such that ∄ value' (addr;
    value' ) ∈ W2 \ (W1 ∩ W2) {
        add (addr; value) to WMerged
    }
    return Wmerged
```

Note that since both W1 and W2 contain all addresses and values written by their parent transaction, W2\W1∩W2 and W1\W1∩W2 do not contain entries written by the parent transaction. Hence, the above code simply adds to the write set of the second transaction the addresses and values written by the first transaction, as long as these addresses were not also written by the second transaction.

Note also that when a conflict is detected, the ConflictAndMergeManagement algorithm for merging operations may in some embodiments be relatively inexpensive to execute. For example, it may simply return the read and write sets of the atomic block that is serialized first. Thus, any overhead associated with merging may only be incurred when there is some benefit from it (e.g., when the results of both threads' runs are accepted).

Finally, note that a thread's read and write logs may also contain addresses that were not accessed by the thread, in some embodiments. This may result in a false conflict, in some cases. In other words, it may be determined that a parallel execution of two blocks cannot be serialized correctly, even though it can, but it cannot result in incorrect behavior.

Some embodiments may not support saving and restoring the state of the read and write logs on the stack. In some such embodiments, when a transaction aborts, addresses it accessed may stay in the read and write logs even if they are not accessed again when it is re-executed. This may result in read and write logs containing addresses not accessed by the transaction successfully run by the thread. While this may in some embodiments result in false conflicts and unnecessary re-runs of transactions, avoiding log checkpointing may facilitate the use of a relatively simple and efficient log implementation. In other embodiments, the conflict detection process may be optimized by making it more conservative, allowing it to possibly report false conflicts. This may in some embodiments be done, for example, by using a bloom filter for constant-time conflict detection.

Supporting N-Way Parallelism

Those skilled in the art will appreciate that essentially the same technique may be used to serialize n parallel transactional threads rather than just 2, while re-running the fewest possible threads in case of conflict. In the worst case, this may require computing the serialization relationships between every pair of threads, requiring $O(n^2)$ log comparisons. In effect, this may be represented by reconstructing a directed graph in which nodes represent threads and edges represent serialization constraints between them, the goal being to remove a minimal set of nodes that break any cycles, serialize the remaining nodes in some topological order, and then re-run the nodes that were removed.

Imposing an Eventual Serialization Order

In some embodiments, rather than arbitrarily assigning an order for serialization when more than one order is valid, the method may include determining the order based on other criteria, such as performance criteria or resource utilization. For example, in the absence of overriding criteria, the method may include determining that one of the child transactions executes faster or using fewer resources than another, and selecting this child transaction to be re-run (i.e., to be serialized after the slower or more resource-intensive transaction). Other suitable criteria may be used to determine serialization order, in other embodiments.

In some embodiments, it may be possible to impose a serialization order on the parallel transactional threads before they are executed. In the code above, for example, a directive or policy may require that thread T<A> appear to execute before thread T<B>. In this case, rather than checking for overlap between the write log of T<B> and the read log of T<A>, the flag A_before_B may be set to "true". Then, if B_before_A also holds true, T<A> may always be serialized and T<B> may always be retried. In such embodiments, the choice of serializing T<B> and retrying T<A> may not exist.

Supporting imposition of a serialization order may in some embodiments provide predictable behavior. In effect, such imposition of order may be thought of as speculating that the threads may be serialized in that order, and if that speculation fails, re-executing the later thread. This technique may in some embodiments be used to speculatively parallelize loops in existing sequential programs. The algorithm described herein may allow speculative loop parallelization in the SpHT setting. More generally, SpHT techniques may be used to speculatively parallelize loops even when the underlying HTM does not provide a mechanism to order the commitment of hardware transactions, in some embodiments.

Taking Advantage of Thread Completion in Serialization

A nested transactional thread T<B> may run until it either executes successfully or detects that the parent transaction is invalid. If the thread retries, it may do so using the original parent read and write sets. However, if its sibling T<A> has already completed execution when T<B> aborts, future conflicts may in some embodiments be avoided if T<B> retries using the read and write sets of T<A> instead. In one embodiment, this may be implemented by having T<B> return control to the parent thread if it detects that T<A> has completed. The parent may then take responsibility for running <B> serially. This optimization may be particularly effective on systems based on work stealing. In these systems, forked threads may actually run serially on a single processor unless another processor becomes idle and "steals" one of them. For example, assume that T<A> is run on the processor on which it was spawned. If after T<A> completes, T<B> has not been stolen, it may be run on the same processor as well, and may be executed as a serial closed nested transaction.

Other Applications of SpHT and Nesting

Using the techniques described herein may also provide support for a user-level abort, i.e., allowing the programmer to explicitly abort a transaction using an abort construct. In some embodiments, user-level abort may be treated just like HTM failure, and may have the same consequences for control flow when it is used within a nested transaction. In other embodiments, user-level aborts may be distinguished from HTM failures. With SpHT, this may be implemented, for example, by marking the checkpoint with a different invalid mark when the failure is due to a user-level abort (in the sequential case), or by reporting a different error code when a thread is terminated due to a user-level abort (in the parallel case). Because the SpHT segments only update the local checkpoint, it may be safe to commit the hardware transaction when a user-level abort occurs, restore the checkpoint to the appropriate state, and mark it appropriately. Any such marking may not be part of a hardware transaction, and hence may not be affected by the nested transaction being aborted.

Similarly, in some embodiments, alternative atomicity may be provided, allowing the programmer to take an alternative action when a nested transaction aborts. For example, in one embodiment, use of the orElse construct may permit the programmer to specify a series of atomic blocks, each of which is attempted in turn until one succeeds. Such an embodiment may use the same mechanisms as those used in ordinary closed nesting of transactions, except that if a nested child block fails, control may pass to the next block, rather than the parent block, and if the last block fails, it may return control to the first block again. In some embodiments, a "tryAtomic" construct may be translated, which may induce an exception if the enclosed block cannot commit. This may be done, for example, by replacing the retry path with SpHT_restore( ), prior to inducing the exception in the context of the parent transaction.

In some embodiments supporting transactional execution, state that is updated early in a long-running transaction (often by a nested transaction) may be required by other running transactions. The transactional memory implementation may need to choose between starving these other transactions and aborting the long-running transaction. An alternative embodiment may provide open nesting, in which a nested transaction is performed and that transaction's effects are immediately committed globally, permitting other operations to access the same data structure while the parent transaction is running. In SpHT, pausing a split transaction may permit a thread to perform arbitrary computation, including starting an entirely new and disjoint split transaction using a separate checkpoint. Moreover, while the split transaction is paused, it may not use any HTM resources, so these may be used for such a computation. It may, therefore, be relatively easy to implement open nesting in SpHT if an open nested transaction is forbidden from accessing data previously read or written by its parent. Furthermore, the parent read and write sets may in some embodiments be made available to an open nested child transaction. In such embodiments, an open nested child may examine these sets and add entries to them, permitting less-restrictive models of open nesting to be implemented.

Integration with HyTM

In some embodiments, one way to overcome hardware transactions not being able to complete when NHT operations are executed is to use software transactions to execute atomic blocks that fail execution by hardware transactions in a hybrid approach. While using a hybrid transactional memory approach may allow execution of atomic blocks including NHT operations, it may force any atomic block that contains a NHT operation to be executed using a software transaction, which may be much slower than an execution using a hardware transaction. This might significantly degrade program performance—especially if NHT operations are common in atomic blocks. For instance, with some HTM implementations, the entry code of a function called from within the atomic block may perform NHT operations. A hybrid solution that uses software transactions to execute atomic blocks that fails execution by hardware transactions is described in U.S. application Ser. No. 10/915,502, titled "Hybrid Software/Hardware Transactional Memory", filed Aug. 10, 2004, and is herein incorporated by reference. Additionally, U.S. patent application Ser. No. 11/591,919, filed on Nov. 2, 2006, titled "System and Method for Supporting Multiple Alternative Methods for Executing Transactions", which is herein incorporated by reference.

As mentioned above, since the SpHT algorithm uses hardware transactions, it may still fail to execute some atomic blocks, and may therefore be combined in a hybrid solution, such as described above. In some embodiments, SpHT methods may be integrated with such a hybrid approach by using a split hardware transaction to try executing a atomic block that cannot be executed using a pure hardware transaction, and switching to executing it using a pure software transaction if the split hardware transaction fails (perhaps after retrying multiple times). Thus, SpHT may be considered an intermediate solution that may be tried after a purely HTM-based execution fails and before resorting to a purely STM-based execution, according to various embodiments.

Figure 9:
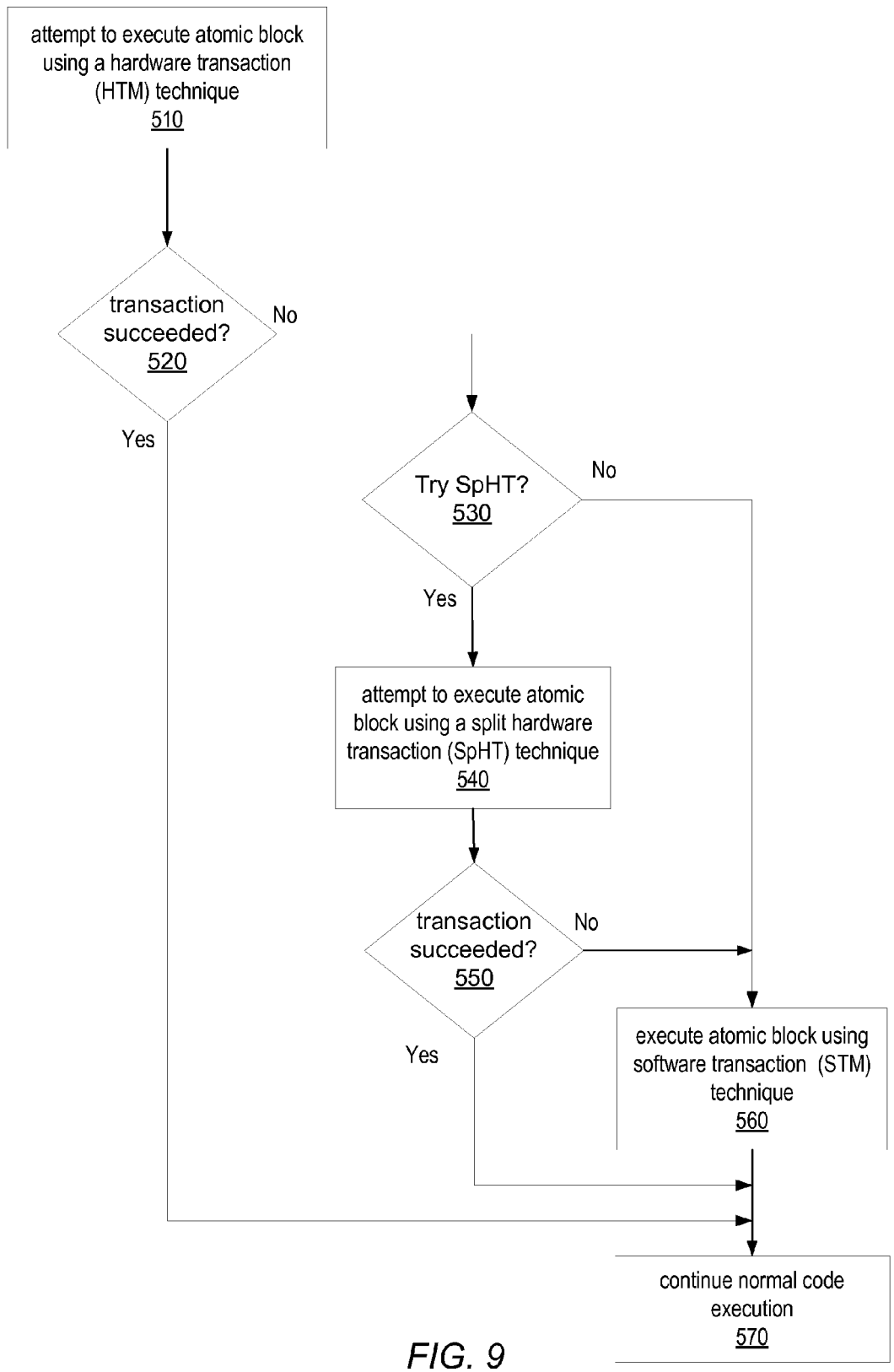
FIG. 9 is a flowchart illustrating one embodiment of a method for including split hardware transactions with other hardware and software transactions as a hybrid transactional memory approach.

FIG. 9 is a flowchart illustrating one embodiment of a method for including split hardware transactions with other hardware and software transactions as a hybrid transactional memory approach. In other embodiments, particular transaction techniques may not support particular functions or system calls, I/O calls, or certain memory access patterns. However, some executions of an atomic block that contain such non-supported instructions might not execute any of them. For example, within an atomic block, the non-supported code may only execute under certain conditions. In other words, the code in the atomic block may include one or more conditional branches only one of which may execute the non-supported code. Also, non-supported events like context switches may happen only rarely during an atomic block execution. Thus, in some embodiments, atomic transaction code 230 may be configured to start the transaction using a transaction technique that does not support the non-supported code or events, such as to use faster hardware transaction techniques for those cases in which the non-supported code or events will not be executed, but to switch over and execute the atomic block using another technique (possibly after several retries) if the non-supported code is executed.

In some embodiments, a hybrid transactional approach may first attempt to execute an atomic block using a hardware transaction technique, as illustrated by block 10. If the transaction succeeds, as indicated by the positive output of decision block 520, atomic transaction code 230 may be configured to resume normal code execution, as indicated by block 570. If however, the attempted hardware transaction technique fails, as indicated by the negative output of block 520, either a split hardware transactional technique may be attempted, as indicated by the positive output of decision block 530, or the atomic block may be executed using a software transaction technique, as illustrated by block 560. As noted above, an attempted hardware transaction may fail for any of various reasons including the occurrence of a NHT event or operation.

If execution of the atomic block is attempted using a split hardware transaction technique, as indicted by block 540, and if the split hardware transaction succeeds, as indicated by the positive output of block 550, normal code execution may be resumed, as in block 570. If however, the attempted split hardware transaction technique fails, as indicated by the negative output of block 550, the atomic block may be executed using a software transaction technique, as in block 560. In general, it may be assumed, according to some embodiments, that a software transactional memory (STM) technique, such as indicated by block 560, will always succeed. In some cases a software transaction may be retried several times before succeeding.

Thus, as illustrated in FIG. 9, multiple types of transaction techniques (e.g., HTM, SpHT, STM, etc.) may be used when executing (or attempting to execute) an atomic block of code. For simplicity, the retrying of transactions and transactional techniques is not illustrated in FIG. 9. In various embodiments, however, various transactional techniques may be tried multiple times prior to attempting a different transactional technique. Additionally, in some embodiments, rather than execute the atomic block using a software transactional technique if a split hardware transactional technique fails, as illustrated in FIG. 9, a hybrid transactional system may try to execute the atomic block again using the hardware transactional technique before resorting to a software transactional technique.

Additionally, in some embodiments, an atomic block may be executing initially with one transactional memory technique and then continue with another without re-executing the whole atomic block. For instance, in one embodiment, if a split hardware transaction is begun and then at some point paused and resumed, and then the active hardware transaction aborts, the read and write sets maintained by the previous (committed) hardware transaction of the SpHT may be used to continue the execution with a software transaction. Instead of re-executing the whole atomic block with a software transaction, the transactional memory technique may start at the point where the SpHT failed, by using the data already gathered by the SpHT, if still valid. In some embodiments, a software transaction may check for the validity of the data in the read and write sets in the same way as SpHT_resume (i.e., such as by re-reading all locations indicated by the read set and verifying that they all still have their respective pre-transactional values). After that point, the atomicity property of the software transaction guarantees that it will abort if any of these locations changes before it tries to commit, according to some embodiments.

In some embodiments, however, compiler 220 may be configured to determine whether or not an atomic block involves code that is not supported by a particular transaction technique and to generate atomic transaction code 230 such that the particular transaction technique is not attempted. Additionally, while described above regarding first beginning a hardware transaction technique and then switching to a split hardware transaction technique, and then using a software transaction technique only if the split hardware transaction fails, in general, the method described above regarding FIG. 9 may be applied to any transactional techniques in which a transaction involves (or potentially involves) non-hardware-transactionable (NHT) operations or any instructions not supported by one of the transaction techniques.

In some embodiments, additional code may be executed by the hardware transactions initiated by a SpHT to guarantee that hardware and software transactions live safely together and do not violate the atomicity of one another. For example, the active hardware transactions of a split hardware transaction may call special functions before any read or write access that checks whether the particular access conflicts with an ongoing software transaction. If it does, the hardware transaction may be aborted. If the access does not conflict with an ongoing software transaction, permission to execute the transactional read or write operation may be granted to the hardware transaction. Furthermore, although only the last hardware transaction initiated by a SpHT may execute the atomic block's writes to the shared memory, coordination calls may be required in all of the other hardware transactions as well, in one embodiment. Without such coordination, a hardware transaction might see a partial effect of a software transaction, violating the atomicity of the atomic block's execution.

Note that the hybrid techniques described above may also be applied to serial and/or parallel nesting of transactions. For example, in various embodiments, one or more child transactions may be explicitly targeted to a particular transaction technique (e.g., HTM, SpHT, STM, etc.), that may be different from that used to execute a segment of its parent code sequence or that used to execute another child transaction. In other embodiments, one or more child transactions may be attempted using a hardware technique, but may be retried using a software technique, as described above.

Access to the Read/Write Set

For some applications, it might be useful to allow non-transactional code access to the local read and write sets maintained by the running split hardware transaction. For example, a debugger that uses SpHT to stop the execution on a breakpoint inside an atomic block may benefit from such access to provide debugging within transactions.

Hardware Support

The SpHT mechanism may maintain the read and write sets completely in software and only use the hardware transactions to guarantee atomicity and memory consistency. Therefore, split hardware transactions may be used on virtually any system that provides minimal HTM support: that is, the ability to begin, abort and commit hardware transactions.

In one embodiment, if the HTM implementation supports non-transactional read and write operations while a hardware transaction is executing, such operations may be used for all accesses to the read and write sets. This may reduce the number of memory accesses done transactionally by a SpHT, and therefore might improve the performance of the SpHT mechanism (if the non-transactional read/write operations are more efficient than the transactional ones), and/or increase the chance that the hardware transactions it uses commit successfully.

In another embodiment, if the HTM implementation supports non-transactional read and write operations while a hardware transaction is executing, a SpHT may be able to commit successfully even if some of the hardware transactions it has executed were aborted and not retried. This can be done, for example, by using the non-transactional write operations to update the read and write sets and record the "progress" of the execution, for example by indicating that the execution has reached a given checkpoint, and the status of the read and write sets at this checkpoint. Then, if the active hardware transaction is aborted, the SpHT may continue executing from the last recorded checkpoint, without retrying the whole code block executed by the aborted hardware transaction. This method may be especially useful with unpredictable NHT events (e.g. a context switch), in which case it may not be possible for the SpHT to pause before the event. The SpHT may be able to recover and continue the execution after an unpredicted NHT event without retrying the SpHT as a whole.

Figure 10:
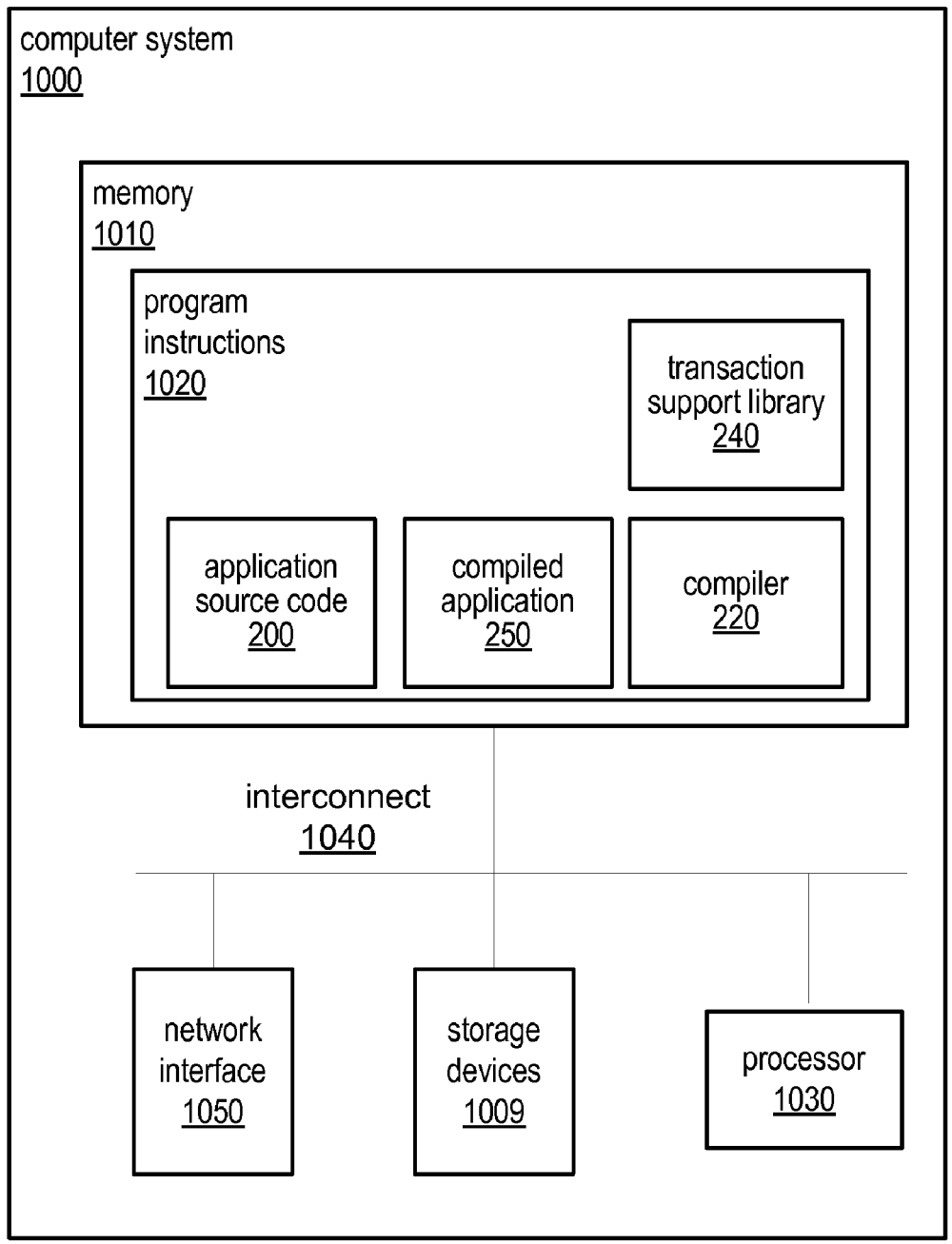
FIG. 10 is a block diagram illustrating an exemplary computer system capable of implementing multiple, alternative methods for executing transactions according to one embodiment.

FIG. 10 illustrates a computing system capable of implementing split hardware transactions, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single-threaded processor, a multi-threaded processor, a multi-core processor, etc.). The computer system 1000 also includes one or more system memories 1010 (e.g., one or more of cache, SRAM, DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s) 1009, the network interface 1050, and the system memory 1010 are coupled to the system interconnect 1040. One or more of the system memories 1010 may embody a compiler configured to generate program instructions for implementing split hardware transactions as described herein. Additionally, one or more of the system memories 1010 may embody an application including code implementing split hardware transactions.

In some embodiments, memory 1010 may include program instructions 1020 configured to implement a compiler, such as compiler 220, configured to generate program instructions for implementing split hardware transactions, as described herein. Additionally, program instructions 1020 may comprise application source code 200 including code configured to request or specify split hardware transactions, as well as compiled application 250, as described herein. Furthermore, program instructions 1020 may be configured to implement a transaction support library 240, configured to provide functions, operations and/or other processes for implementing split hardware transactions, as described herein. Compiler 220, application source code 200, compiled application 250, and/or transaction support library 240 may each be implemented in any of various programming languages or methods. For example, in one embodiment, compiler 220 and transaction support library 240 may be Java™ based, while in other embodiments, they may be written using the C or C++ programming languages. Similarly, application code 200 may be implemented in Java™, C, or C++, among other programming languages, according to various embodiments. Moreover, in some embodiments, compiler 220, transaction support library 240, and application code 200 may not be implemented using the same programming language. For example, application code 200 may be C++ based, while compiler 220 may be developed using C. Note also that although various examples included herein refer to both shared memory and local memory, these structures may be implemented as different memory spaces (e.g., a shared memory space and one or more local memory spaces) within a single physical memory or as different memory spaces distributed across any number of physical memories, in different embodiments.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method for executing nested atomic blocks using split hardware transactions, comprising:
    initiating execution of an atomic block of code comprising one or more child code sequences nested within a parent code sequence; wherein each of the parent code sequence and the one or more child code sequences comprises code to implement one or more memory accesses targeted to a shared memory space;
    executing a segment of the parent code sequence using a hardware transaction;
    pausing execution of the parent code sequence, wherein said pausing comprises terminating the hardware transaction for the parent code sequence;
    for each of the one or more child code sequences, executing the child code sequence as a respective hardware transaction for the child code sequence;
    in response to a failure of a hardware transaction for one of the one or more child code sequences, retrying the one of the one or more child code sequences without retrying the parent code sequence, wherein said retrying the one of the one or more child code sequences comprises re-executing the failed hardware transaction for the one of the one or more child code sequences;
    in response to successful execution of the one or more hardware transactions for the one or more child code sequences, resuming execution of the parent code sequence, wherein said resuming comprises executing another segment of the parent code sequence using another hardware transaction;
    determining if all values read by the atomic block are consistent with a current state of the shared memory space; and
    in response to determining that all values read by the atomic block are consistent with the current state of the shared memory space, atomically committing results of execution of the atomic block in the shared memory space.

2. The method of claim 1, wherein in said executing the segment and said executing the one or more child code sequences, executing any write accesses targeted to the shared memory space comprises writing values to a local memory space rather than to the shared memory space.

3. The method of claim 1, wherein said pausing comprises saving a checkpoint of any previously executed memory accesses of the atomic block targeted to the shared memory space, wherein the checkpoint comprises one or more of a current read set and a current write set of the execution of the atomic block.

4. The method of claim 3, wherein said retrying further comprises, prior to re-executing the failed hardware transaction for the one of the one or more child code sequences, restoring at least one of the read set and the write set according to the checkpoint.

5. The method of claim 4, wherein said saving a checkpoint comprises pushing the checkpoint on a stack and said restoring comprises copying the checkpoint off the top of the stack.

6. The method of claim 5, wherein said resuming further comprises popping the checkpoint off the stack and discarding the checkpoint.

7. The method of claim 1, wherein the one or more child code sequences comprises two or more child code sequences coded for parallel execution, and wherein executing the one or more child code sequences comprises:
    executing the two or more child code sequences in parallel as separate atomic transactions executed atomically with respect to each other;
    determining if any memory accesses of the two or more child code sequences result in a memory inconsistency between the two or more child code sequences; and
    in response to determining that one or more memory accesses of the two or more child code sequences results in a memory inconsistency between the two or more child code sequences, retrying at least one of the two or more child code sequences in a serialized manner such that the memory inconsistency is resolved.

8. The method of claim 1, wherein the failure of the hardware transaction for the one of the one or more child code sequences comprises one or more of: a hardware transaction failure and a memory consistency validation failure.

9. The method of claim 1, wherein the one or more child code sequences comprises two or more child code sequences coded to be executed serially, further comprising:
    for each child code sequence, prior to said executing the child code sequence, determining if all values previously read by the atomic block are consistent with a current state of the shared memory space;
    wherein said executing the child code sequence is performed in response to determining that all values previously read by the atomic block are consistent with the current state of the shared memory space.

10. The method of claim 1, further comprising, for each of the one or more child code sequences, in response to successful execution of the hardware transaction for the child code sequence, committing results of the execution of the hardware transaction for the child code sequence to a local memory space.

11. The method of claim 1, wherein at least one of the one or more child code sequences comprises an additional code sequence nested at an additional nesting level within the child code sequence, further comprising:
    executing a portion of the at least one child code sequence as a hardware transaction for the at least one child code sequence;
    pausing execution of the at least one child code sequence;
    executing the additional code sequence as an additional hardware transaction;
    in response to a failure of the additional hardware transaction, retrying the additional code sequence without retrying the at least one child code sequence, wherein said retrying the additional code sequence comprises re-executing the failed additional hardware transaction;
    in response to successful execution of the additional hardware transaction, resuming execution of the child code sequence, wherein said resuming comprises executing another portion of the child code sequence as another hardware transaction.

12. A system supporting nested atomic blocks using split hardware transactions, comprising:
    a processor; and
    a memory coupled to the processor, wherein the memory comprises program instructions executable by the processor to implement:
        initiating execution of an atomic block of code comprising one or more child code sequences nested within a parent code sequence; wherein each of the parent code sequence and the one or more child code sequences comprises code to implement one or more memory accesses targeted to a shared memory space;
        executing a segment of the parent code sequence using a hardware transaction;
        pausing execution of the parent code sequence, wherein said pausing comprises terminating the hardware transaction for the parent code sequence;
        for each of the one or more child code sequences, executing the child code sequence as a respective hardware transaction for the child code sequence;
        in response to a failure of a hardware transaction for one of the one or more child code sequences, retrying the one of the one or more child code sequences without retrying the parent code sequence, wherein said retrying the one of the one or more child code sequences comprises re-executing the failed hardware transaction for the one of the one or more child code sequences;
        in response to successful execution of the one or more hardware transactions for the one or more child code sequences, resuming execution of the parent code sequence, wherein said resuming comprises executing another segment of the parent code sequence using another hardware transaction;
        determining if all values read by the atomic block are consistent with a current state of the shared memory space; and
        in response to determining that all values read by the atomic block are consistent with the current state of the shared memory space, atomically committing results of execution of the atomic block in the shared memory space.

13. The system of claim 12, wherein in said executing the segment and said executing the one or more child code sequences, executing any write accesses targeted to the shared memory space comprises writing values to a local memory space rather than to the shared memory space.

14. The system of claim 12,
    wherein said pausing comprises saving a checkpoint of any previously executed memory accesses of the atomic block targeted to the shared memory space, wherein the checkpoint comprises one or more of a current read set and a current write set of the execution of the atomic block; and
    wherein said retrying further comprises, prior to re-executing the failed hardware transaction for the one of the one or more child code sequences, restoring at least one of the read set and the write set according to the checkpoint.

15. The system of claim 12, wherein the one or more child code sequences comprises two or more child code sequences coded for parallel execution, and wherein executing the one or more child code sequences comprises:
    executing the two or more child code sequences in parallel as separate atomic transactions executed atomically with respect to each other;
    determining if any memory accesses of the two or more child code sequences result in a memory inconsistency between the two or more child code sequences; and
    in response to determining that one or more memory accesses of the two or more child code sequences results in a memory inconsistency between the two or more child code sequences, retrying at least one of the two or more child code sequences in a serialized manner such that the memory inconsistency is resolved.

16. The system of claim 12, wherein the one or more child code sequences comprises two or more child code sequences coded to be executed serially, wherein the program instructions are further executable to implement:
    for each child code sequence, prior to said executing the child code sequence, determining if all values previously read by the atomic block are consistent with a current state of the shared memory space;
    wherein said executing the child code sequence is performed in response to determining that all values previously read by the atomic block are consistent with the current state of the shared memory space.

17. A computer-readable storage medium comprising program instructions supporting nested atomic blocks using split hardware transactions, wherein the program instructions are computer-executable to implement:
    initiating execution of an atomic block of code comprising one or more child code sequences nested within a parent code sequence; wherein each of the parent code sequence and the one or more child code sequences comprises code to implement one or more memory accesses targeted to a shared memory space;
    executing a segment of the parent code sequence using a hardware transaction;
    pausing execution of the parent code sequence, wherein said pausing comprises terminating the hardware transaction for the parent code sequence;
    for each of the one or more child code sequences, executing the child code sequence as a respective hardware transaction for the child code sequence;
    in response to a failure of a hardware transaction for one of the one or more child code sequences, retrying the one of the one or more child code sequences without retrying the parent code sequence, wherein said retrying the one of the one or more child code sequences comprises re-executing the failed hardware transaction for the one of the one or more child code sequences;
    in response to successful execution of the one or more hardware transactions for the one or more child code sequences, resuming execution of the parent code sequence, wherein said resuming comprises executing another segment of the parent code sequence using another hardware transaction;
    determining if all values read by the atomic block are consistent with a current state of the shared memory space; and
    in response to determining that all values read by the atomic block are consistent with the current state of the shared memory space, atomically committing results of execution of the atomic block in the shared memory space.

18. The storage medium of claim 17,
    wherein in said executing the segment and said executing the one or more child code sequences, executing any write accesses targeted to the shared memory space comprises writing values to a local memory space rather than to the shared memory space;

wherein said pausing comprises saving a checkpoint of any previously executed memory accesses of the atomic block targeted to the shared memory space, wherein the checkpoint comprises one or more of a current read set and a current write set of the execution of the atomic block; and wherein said retrying further comprises, prior to re-executing the failed hardware transaction for the one of the one or more child code sequences, restoring at least one of the read set and the write set according to the checkpoint.

19. The storage medium of claim 17, wherein the one or more child code sequences comprises two or more child code sequences coded for parallel execution, and wherein executing the one or more child code sequences comprises:

executing the two or more child code sequences in parallel as separate atomic transactions executed atomically with respect to each other;

determining if any memory accesses of the two or more child code sequences result in a memory inconsistency between the two or more child code sequences; and in response to determining that one or more memory accesses of the two or more child code sequences results in a memory inconsistency between the two or more child code sequences, retrying at least one of the two or more child code sequences in a serialized manner such that the memory inconsistency is resolved.

20. The storage medium of claim 17, wherein the one or more child code sequences comprises two or more child code sequences coded to be executed serially, wherein the program instructions are further executable to implement:

for each child code sequence, prior to said executing the child code sequence, determining if all values previously read by the atomic block are consistent with a current state of the shared memory space;

wherein said executing the child code sequence is performed in response to determining that all values previously read by the atomic block are consistent with the current state of the shared memory space.

* * * * *